April 9, 1935.   W. I. WHEELER   1,997,503
POWER TRANSMISSION MECHANISM
Filed May 18, 1932   7 Sheets-Sheet 1
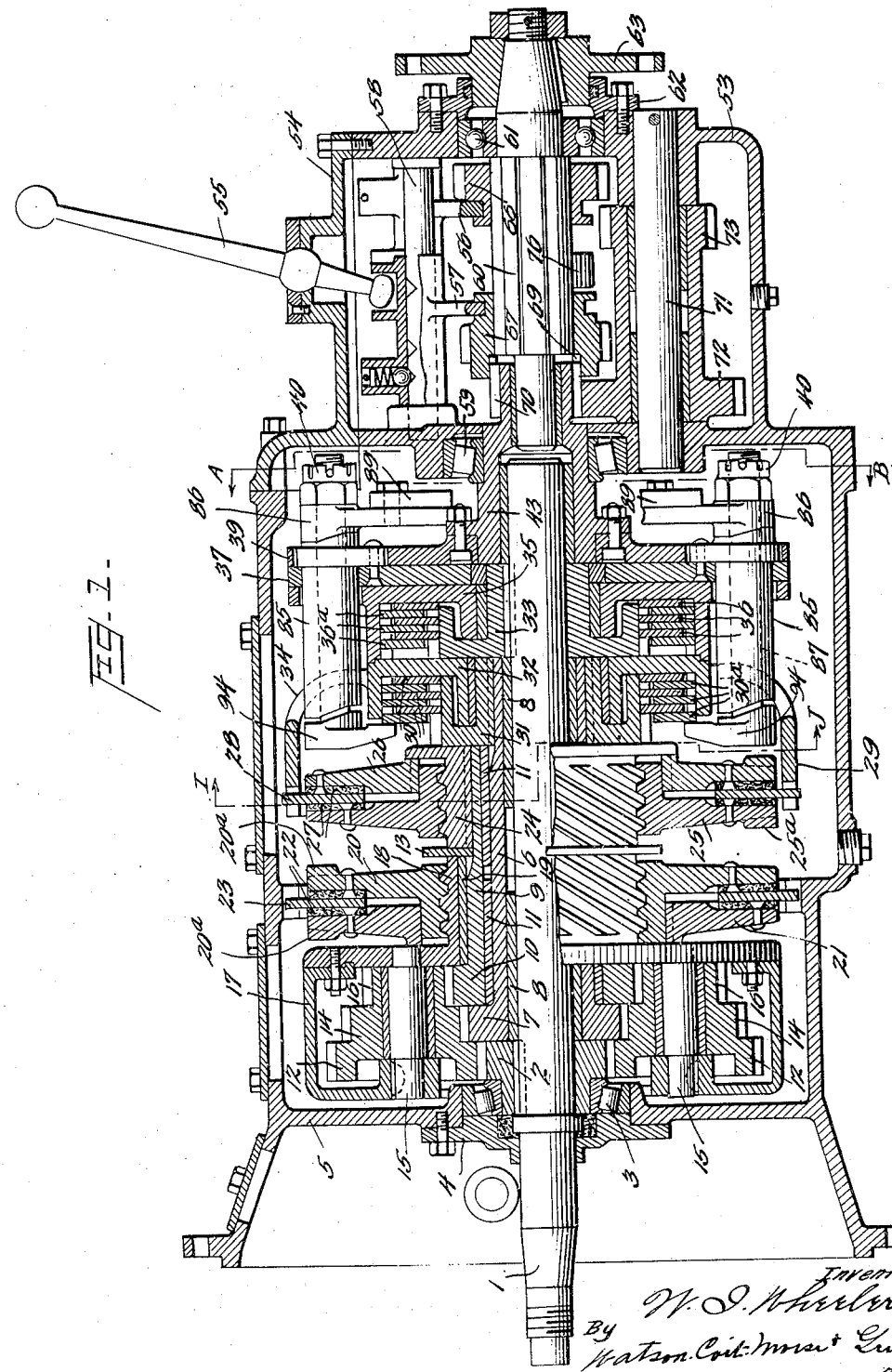

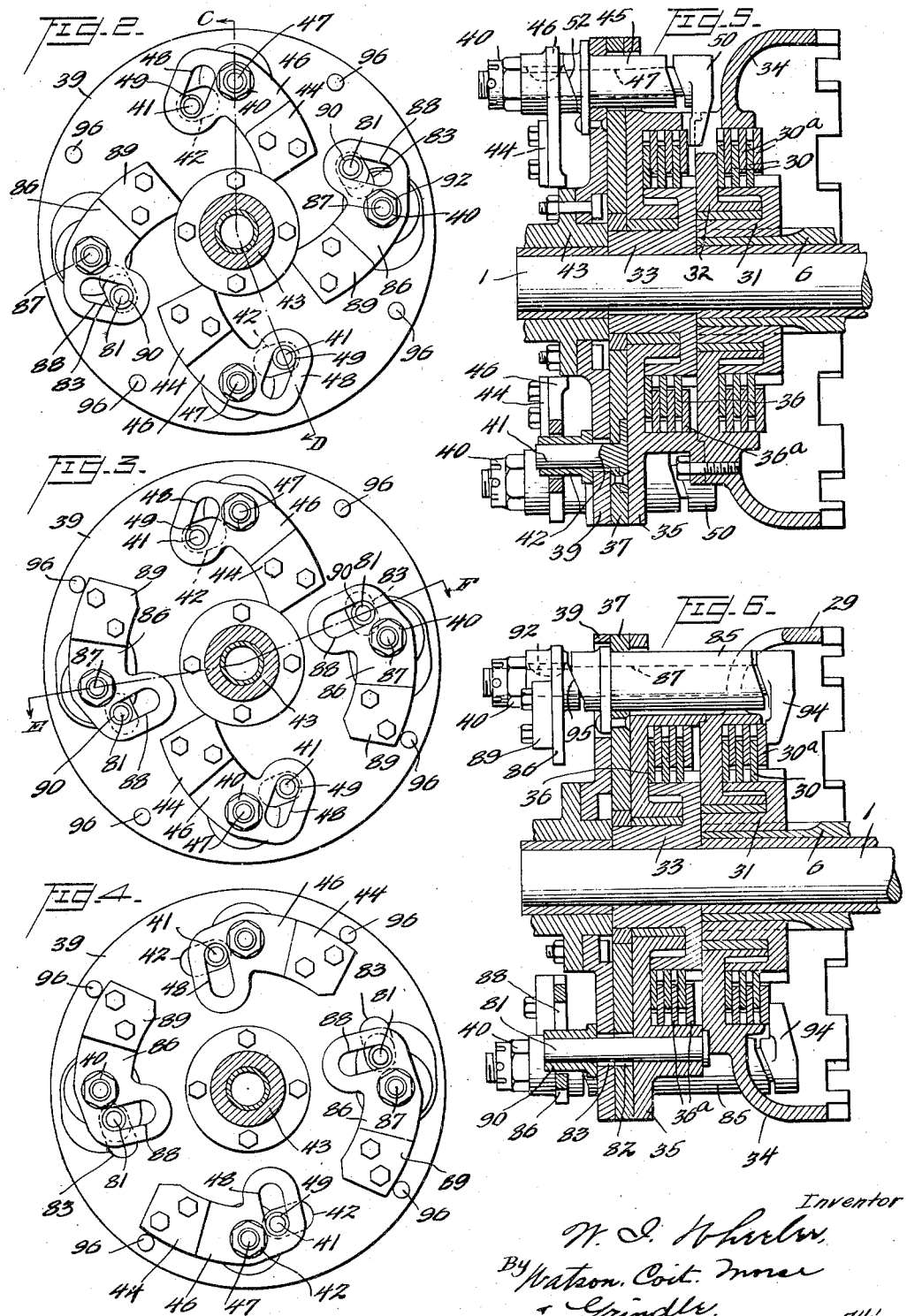

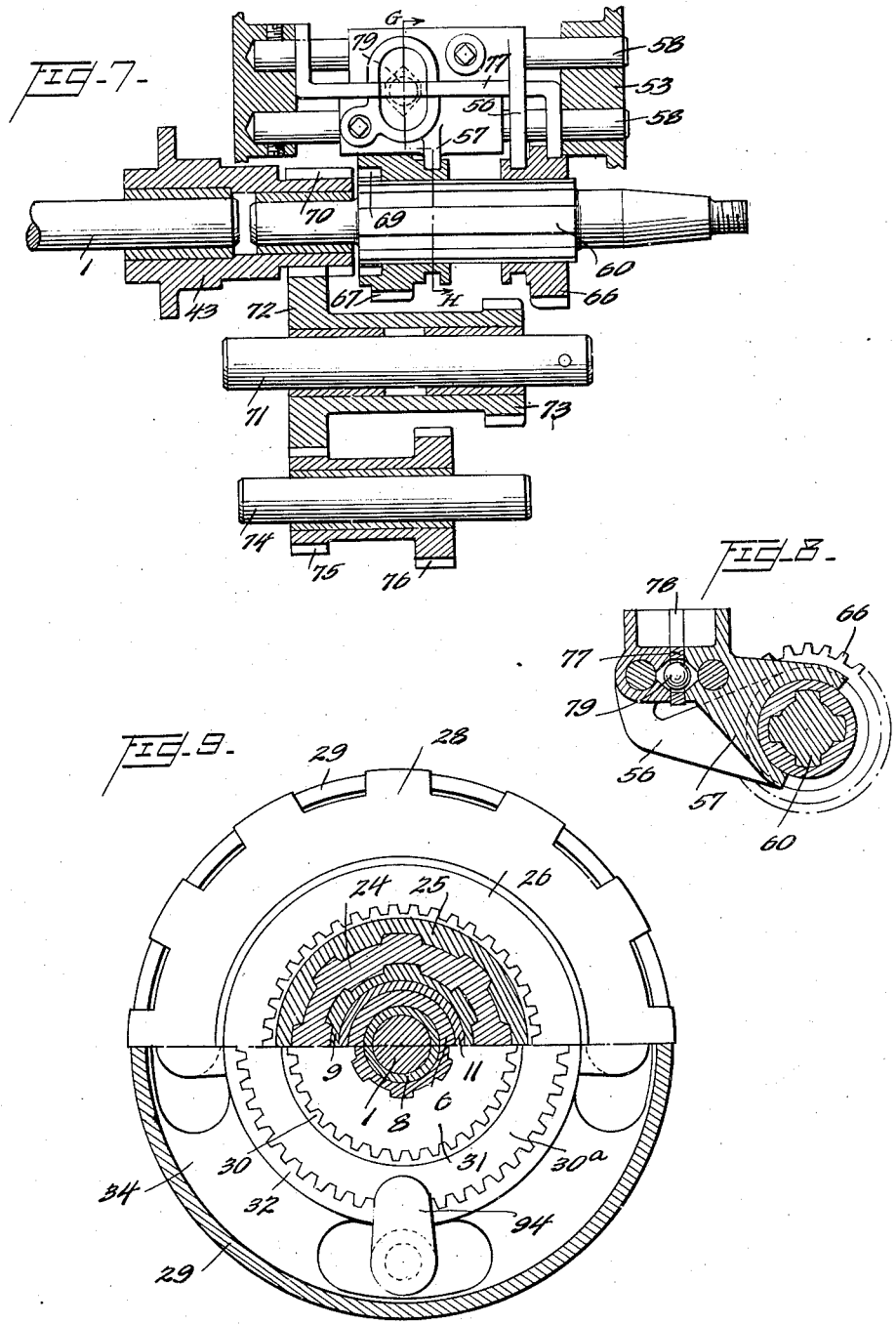

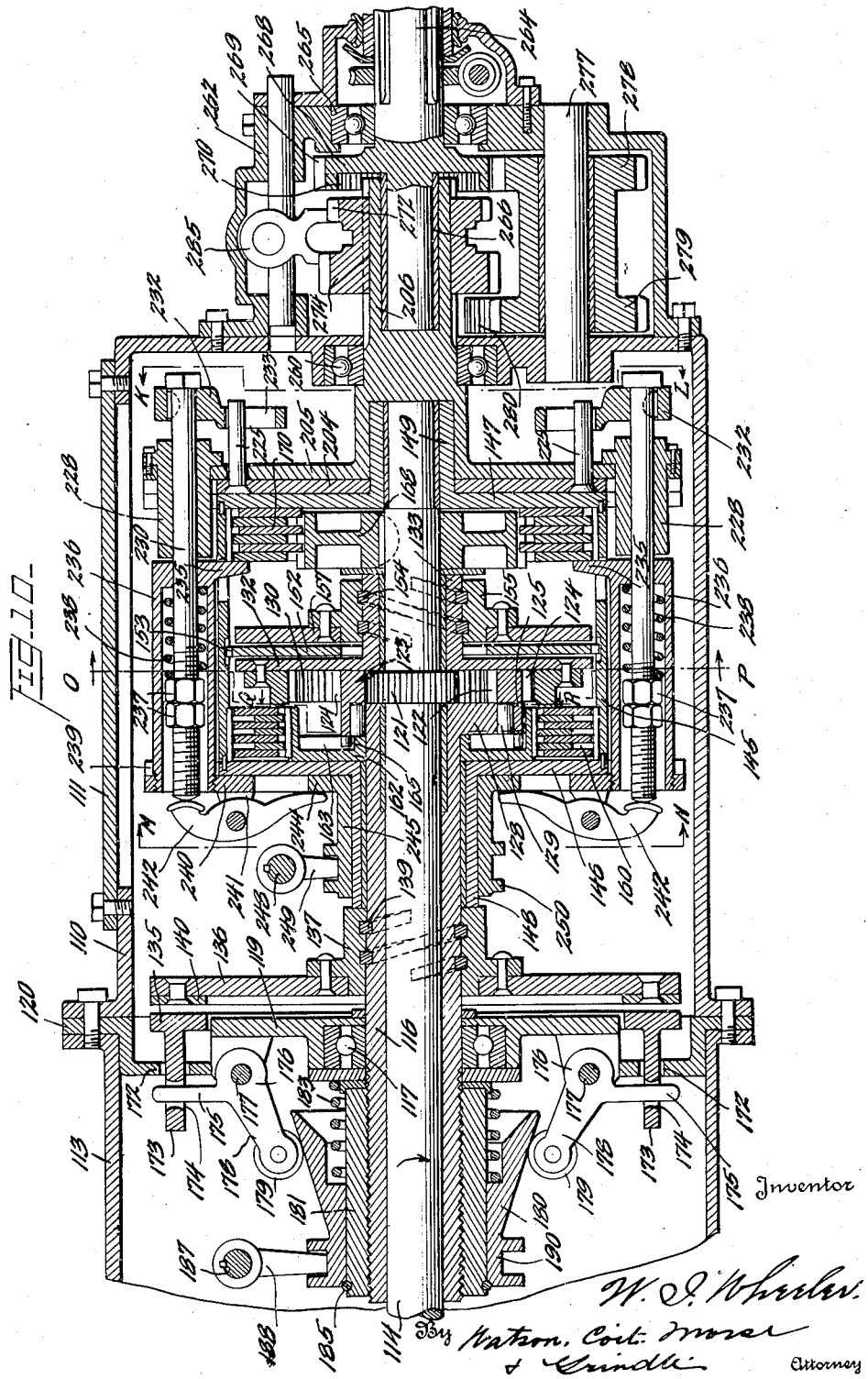

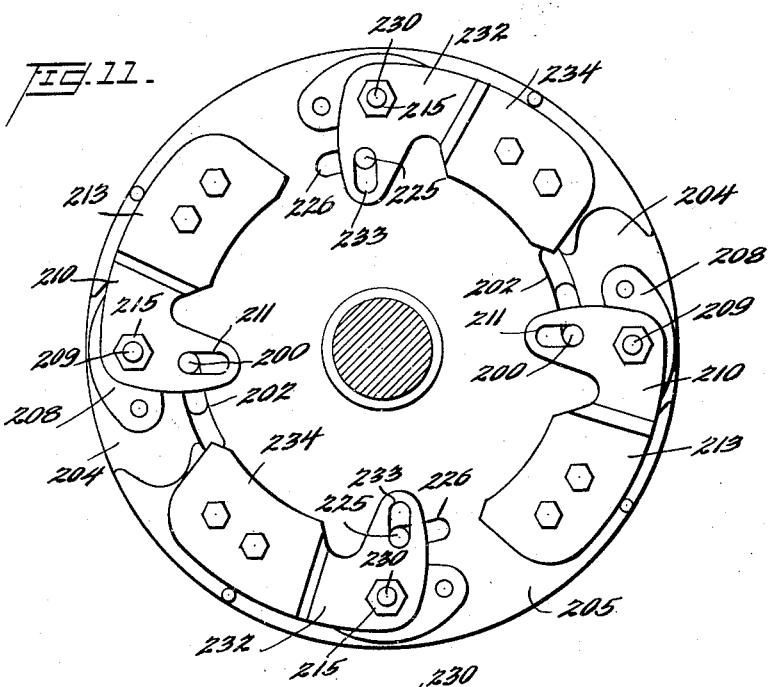
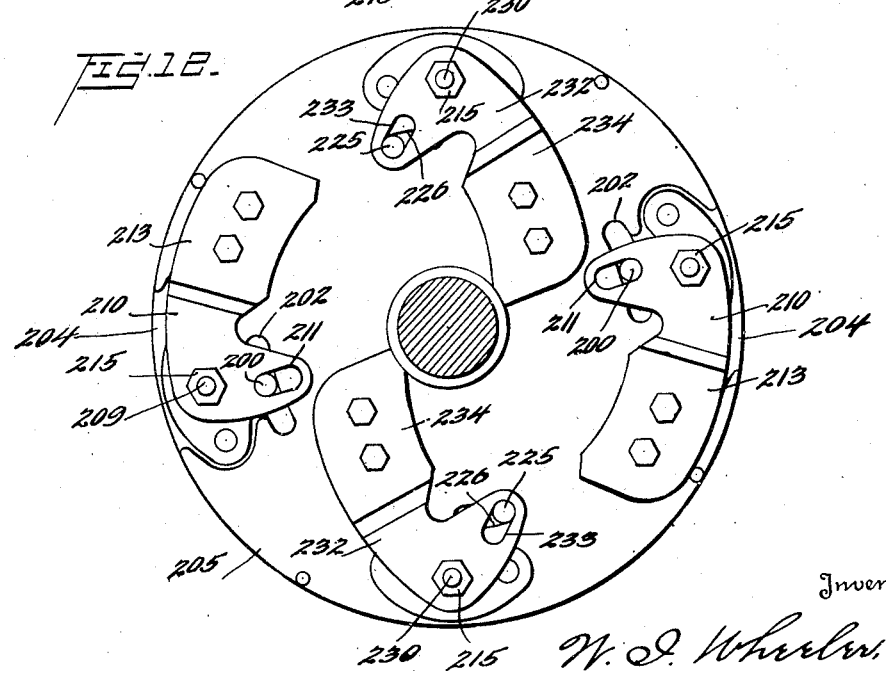

April 9, 1935.  W. I. WHEELER  1,997,503
POWER TRANSMISSION MECHANISM
Filed May 18, 1932   7 Sheets-Sheet 6
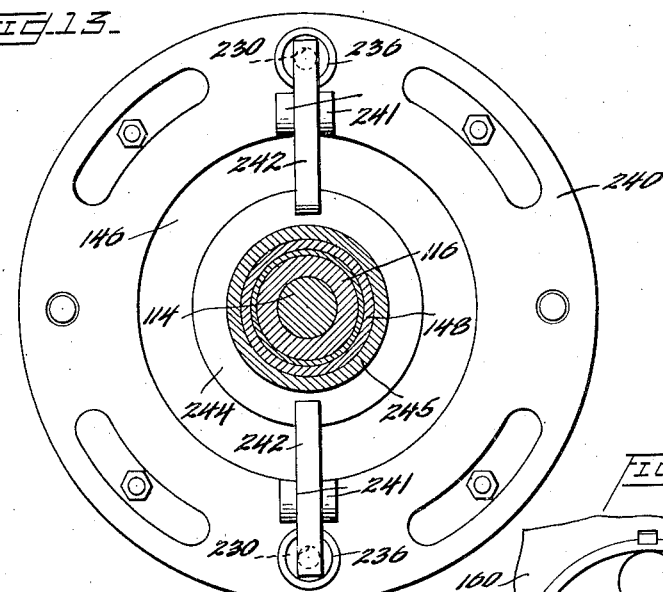
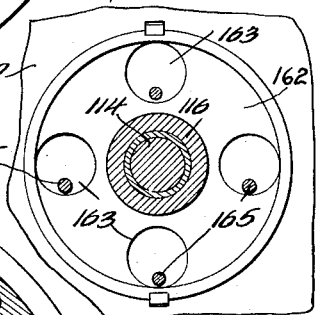
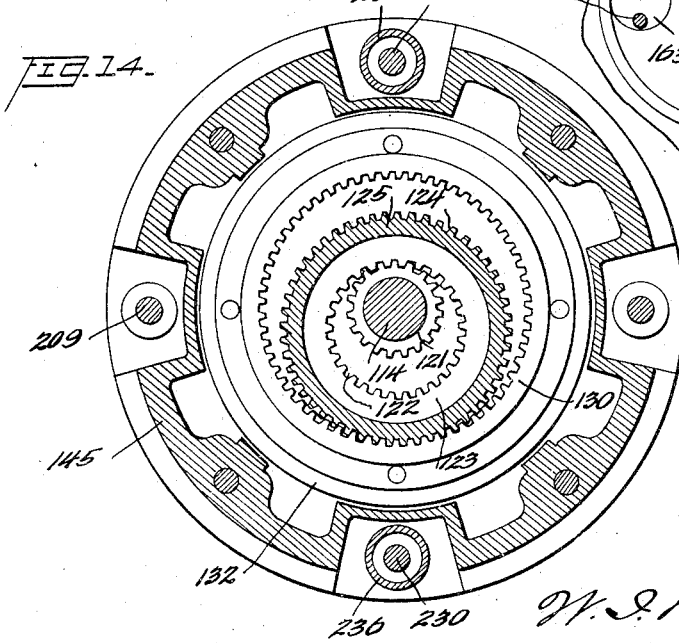
Inventor
W. I. Wheeler
By Watson, Coit, Morse & Grindle
Attorney

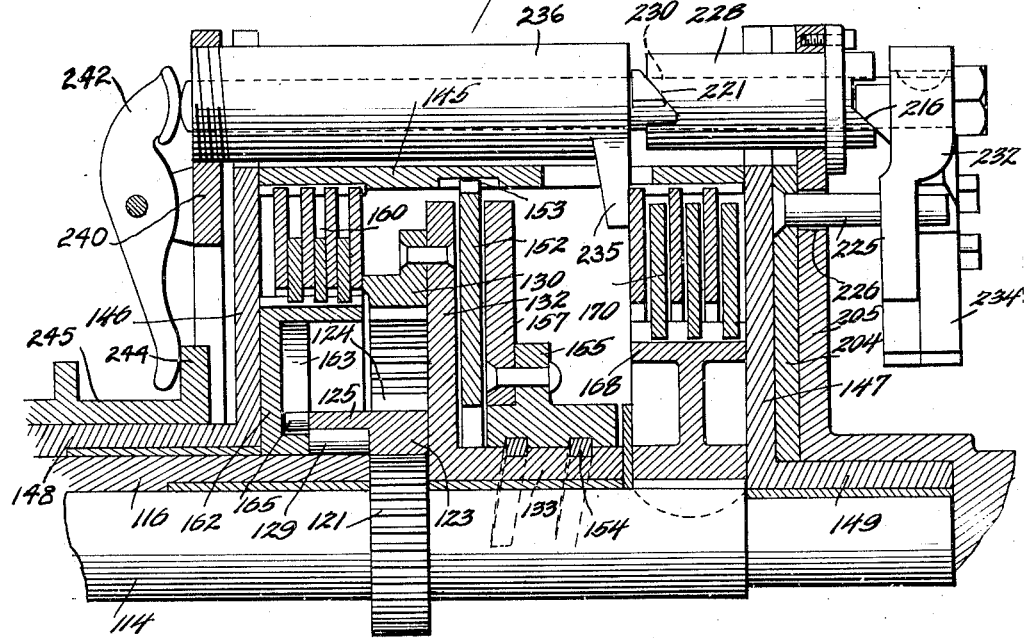
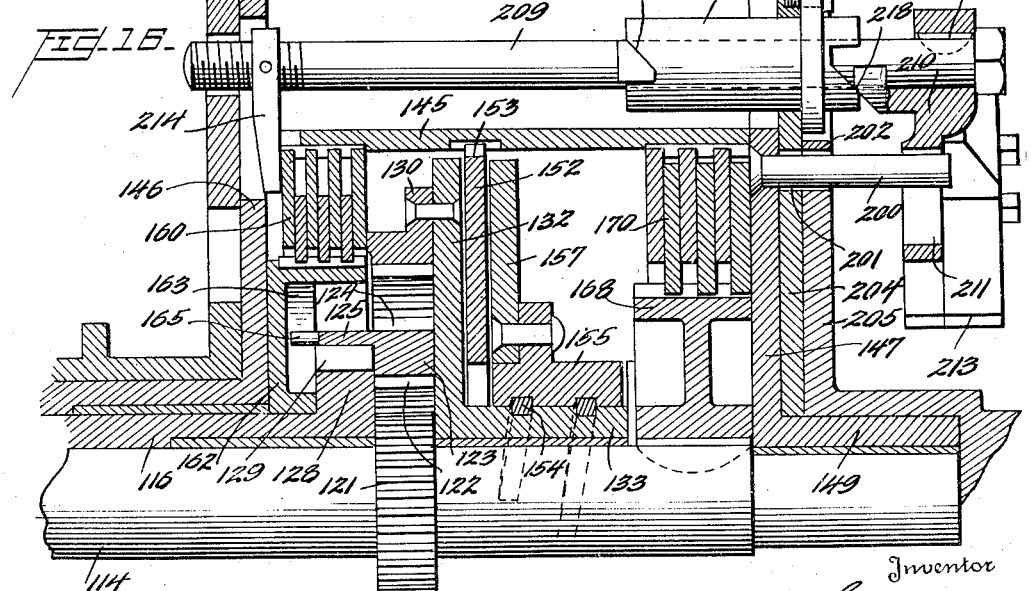

Patented Apr. 9, 1935

1,997,503

UNITED STATES PATENT OFFICE 1,997,503

POWER TRANSMISSION MECHANISM

William Isiah Wheeler, Scottville, Ill.

Application May 18, 1932, Serial No. 612,077

45 Claims. (Cl. 74—260)

This invention relates to power transmission mechanisms and more particularly to transmission mechanisms of the variable ratio or change speed type in which the different speed ratios are automatically selected to accord with changes in operating conditions to which the transmission mechanism is subjected the present application being a continuation in part of my prior application Serial No. 291,687, filed July 10, 1928.

It is the principal object of the invention to provide a transmission mechanism of this character in which the selection of the proper speed ratio is effected in response to a change either in the torque transmitted through the mechanism or in the speed of operation of the element driven thereby. More specifically, the object of the present invention is to provide a transmission mechanism adapted to be interposed between a driving and a driven element in which the speed ratio is automatically increased with increase in speed of the driven element and is automatically reduced with increase in the torque transmitted through the mechanism, the effect upon the mechanism of the transmitted torque and the speed of the driven element being directly opposed, whereby the speed ratio is determined by the combined action of the forces resulting from change in transmitted torque and change in speed of the driven element.

The invention is particularly applicable to motor vehicles since it permits the driver of the vehicle to devote his entire attention to driving operations other than the shifting of gears, and furthermore ensures that the speed ratio at which the vehicle is being operated is the proper one under the particular conditions of operation existing.

For instance, in the operation of a large motor bus the driver is usually required to collect fares from the passengers entering the vehicle and to make change without unnecessary delay, it being customary to start the vehicle before these operations are completed. It is thus quite apparent that the additional burden imposed upon the driver of shifting the gearing at this time not only increases the difficulty of operating the vehicle but is likely to prove dangerous even in the case of a skilled driver. Furthermore, considerable injury may be done, particularly in the case of a heavy vehicle such as a truck or a motor bus in which a large torque is transmitted through the change speed gearing, if this gearing is not selected in the most skillful manner and in accordance with the conditions of torque and speed under which the vehicle is operating.

It is a feature of the invention that the transmission mechanism may be readily manipulated to provide a plurality of speed ratios, automatically selected, when the vehicle is being driven either in a forward or reverse direction.

A further object of the invention is to provide a transmission mechanism in which the various speed ratios are automatically selected and in which the gears through which the torque is transmitted remain always in mesh regardless of the speed ratio selected.

A further object of the invention is the provision of means whereby the mechanism may be manually controlled to select a speed ratio other than that determined by the operating conditions, for instance, to reduce the speed ratio when the vehicle is descending a hill for the purpose of increasing the braking power exerted on the vehicle by the motor.

It is essential that a transmission mechanism for use in a motor vehicle be simply constructed and extremely compact, particularly such portions of the mechanism as are required to effect the desired automatic control of the speed ratio. These various objects are attained in a gearing constructed in accordance with the present invention which is in addition characterized by positive action under all operating conditions.

Further objects and features of the invention will be apparent from the following description taken in connection with the accompanying drawings, in which:

Figure 1 is a vertical sectional view through a transmission mechanism embodying the principles of the invention;

Figures 2, 3, and 4 are sectional views taken on the line A—B of Figure 1 showing the parts in the several positions which they occupy under different conditions of operation;

Figure 5 is a sectional view taken substantially on the line C—D of Figure 2;

Figure 6 is a sectional view taken on the line E—F of Figure 3;

Figure 7 is a diagrammatic developed view illustrating the manually operated change speed gearing shown in Figure 1 which acts as an auxiliary mechanism for obtaining additional speed ratios and reversal of the direction of rotation of the driven element;

Figure 8 is a sectional view taken on the line G—H of Figure 7;

Figure 9 is a sectional view taken on the line I—J of Figure 1;

Figure 10 is a vertical sectional view of a modified form of transmission mechanism embodying the principles of the invention;

Figures 11 and 12 are sectional views taken substantially on the line K—L of Figure 10 illustrating the parts in the positions which they occupy under different conditions of operation;

Figure 13 is a sectional view taken substantially on the line M—N of Figure 10;

Figure 14 is a sectional view taken substantially on the line O—P of Figure 10;

Figure 15 is an enlarged fragmentary view partly in section and partly in elevation corresponding to a portion of the mechanism shown in Figure 10;

Figure 16 is a horizontal sectional view partly in elevation corresponding to Figure 15; and Figure 17 is a sectional view on the line Q—R of Figure 10.

In order to facilitate an understanding of the invention, the various elements shown in the drawings and their relationship are hereinafter described in specific language. It will nevertheless be appreciated that no limitation of the scope of the invention is thereby intended, but that such alterations and variations are contemplated as may be found desirable under different conditions of use.

Referring now to the form of the invention shown in Figures 1 to 9 inclusive of the drawings, it will be observed that the driving shaft indicated at 1, and adapted for connection to a prime mover or other source of power, is supported for rotation in a transmission casing 5 enclosing the entire transmission mechanism. This may be conveniently effected adjacent the forward end of the casing by the provision of roller bearings 3 in which the extended hub of the gear 2 is journalled, this gear comprising the driving gear of the transmission mechanism and being keyed or otherwise secured for rotation with the shaft 1, a suitable bearing retainer 4 being bolted to the casing. Adjacent the gear 2 and rotatably mounted on the shaft 1 by means of bushings 8 is a gear 7 of larger diameter than the gear 2, the gear 7 being provided with a relatively long hub 6 for a purpose hereinafter described.

A third gear 10 of still larger diameter is in turn located adjacent the gear 7 and is journalled on the hub 6 of the latter by means of suitable bushings 11, the gear 10 being similarly provided with a longitudinally extending hub 9. An annular gear housing 17 is provided with a hub portion 18 journalled on the hub portion 9 of the gear 10 by means of a bushing 19, this gear housing being preferably made in sections to facilitate assembly thereof, the sections being secured together in the manner shown in Figure 1 of the drawings. The periphery of the hub portion 18 of the housing 17 has a threaded or equivalent relation with a member 20 which, in cooperation with a member 21 splined thereto and axially slidable thereon, comprises one element of a brake, the other element 23 of the brake consisting of an annular disk member splined or similarly connected with the casing 5 so that the member 23 may move axially of the casing but is restrained against rotational movement therein about the axis of the shaft 1. Friction facings 22 are secured to the members 20 and 21 to provide the required degree of friction when the cooperating elements of the brake are urged into braking relationship as hereinafter described.

The housing 17 supports a plurality of shafts 15 arranged parallel to and equidistant from the driving shaft 1. The shafts 15 are preferably retained in the housing against axial movement and may be keyed thereto as shown in the drawings to prevent rotative movement thereof, each shaft serving as a support for a compound gear element comprising three gears or toothed portions 12, 14, and 16 preferably formed integrally and of reduced size in the order named. Each of the gears 12 meshes with the gear 2, the gears 14 with the gear 7, and the gears 16 with the gear 10, the arrangement providing in effect a planetating transmission since the housing 17 and the gears 12, 14, and 16 carried thereby may revolve about the axis of the shaft 1.

The extended hub 9 of the gear 10 carries a member 24 which is keyed or otherwise secured thereto, the member 24 having a threaded or equivalent relationship with the member 25, which in cooperation with a member 26, splined thereto and axially slidable thereon, comprises one element of an overrunning clutch, the other element consisting of an annular disk member 28. Friction facings 27 are secured to the members 25 and 26 to provide the required degree of friction when the cooperating members of the clutch are urged into clutching relationship as hereinafter described. A disk 13 is preferably interposed between the hub portion 18 of the housing 17 and the member 24 to effect proper spacing thereof.

A member 31 splined or otherwise secured for rotation with the hub 6 of the gear 7 carries on its periphery a series of axially movable clutch plates 30 interleaved with a plurality of corresponding axially movable clutch plates 30a carried by a member 32 which is journalled on the member 31. The member 32 is provided with an outwardly extending yoke 34 which may be formed integrally therewith, this yoke supporting an annular member 29 having a non-rotative connection with the member 28 permitting axial movement of the latter, preferably by the provision of interlocking teeth on these members as indicated in Figures 1 and 5. A member 33 is keyed or otherwise secured to the driving shaft 1 and carries a plurality of clutch plates 36 cooperating with similar clutch plates 36a carried by a member 35 which is in turn journalled on the member 33. It will be understood that the precise construction of the two similar clutch devices just described is not material, although the conventional arrangement shown in the drawings and including interleaved plates splined to the members to be clutched is preferred. It will be observed from Figure 5 of the drawings that the members 32 and 35 are secured together, preferably by means of bolts, and thus rotate as a unit.

It will be convenient at this stage of the description to review briefly the construction thus far described and to indicate the nature of operation, assuming that the member 35 is the driven element and assuming that the clutches 30 and 36 are engaged and released by mechanism dealt with hereinafter and operating in accordance with variations in torque and speed.

In the initial condition of the apparatus with the vehicle clutch disengaged the members 23, 28, 32, and 35 are released from frictional connection with the associated members 20, 25, 31, and 33 respectively, there being substantially no clutching engagement between the cooperating parts. If the vehicle clutch is engaged and torque is thus applied to rotate the shaft 1 in a clockwise direction as viewed from the forward end of the transmission, the gears 7 and 10 will tend to remain stationary owing partly to the inertia of the members 31 and 24 which are respectively keyed thereto and partly to the fact that some degree of friction is developed between the members 24 and 31 and the parts connected therewith, principally between the cooperating clutch plates 30 and 30a, and the clutch members 25, 26, and 28, which although they are disengaged, exert some retarding action. As the result of this resistance to movement of the gears 7 and 10 the compound gears 12, 14, 16 will tend to rotate in a counterclockwise direction by reason of the meshing of the gear 12 with the gear 2, and the compound gears will thus tend to roll around the gears 7 and 10, or either one of these gears, to rotate the housing 17 in a counterclockwise direction. The effect of this is to thrust the member 20 to the left as shown in Figure 1 by reason of the threaded connection between this member and the hub 18 of the housing 17 and thus to grip the member 23 between the cooperating members 20 and 21. This action is facilitated by the provision on the members 20 and 21 of enlarged or weighted portions 20a which tend to retain these members against rotation since they are slightly unbalanced about the axis of the shaft 1. In this manner the housing 17 is clutched to the transmission casing 5 and the compound gears 12, 14, and 16 are rotated in a counterclockwise direction about the axis of the shafts 15 on which they are supported and which are temporarily held against planetation about the axis of the shaft 1. It will be observed that the gear 7 is connected only to the member 31 and since the clutch plates 30 and 30a are not engaged, the gear 7 will rotate idly. The gear 10, however, is keyed to the member 24 which is in turn provided with a threaded connection with the member 25 and since the gear 10 is being driven in a clockwise direction, the members 25 and 26 will be threaded or screwed together to clamp the member 28 therebetween, this action being similarly facilitated by the provision of enlarged portions or weights 25a on the members 25 and 26 which tend to retain the latter in a stationary position. Thus the rotation of the gear 10 in a clockwise direction is transmitted through the members 24, 25, 26 to the cooperating clutch member 28 and thence through the member 29 and yoke 34 to the member 32 and the member 35 secured to the latter. It will be observed that in this manner the member 35 which for convenience may be considered the driven element is rotated at a speed determined by the ratios of the gears 2, 12, 16, and 10 to provide the first or lowest speed ratio for which the transmission mechanism is constructed.

If it be now presumed that by the means to be hereinafter described the clutch plates 30 and 30a are engaged as the speed of the vehicle increases, the gear 7 will be coupled, through its hub 6 and the member 31 keyed to the hub, with the member 32 and thereby the driven member 35. The housing 17 remains stationary since the conditions affecting the operation of the braking members 20 and 21 on the cooperating member 23 have not been altered, the compound gears still tending to roll in a counterclockwise direction around the gear 7. However, the member 29 carrying the member 28 and formed integrally with the member 32 is now rotated at an increased rate of speed in a clockwise direction by means of the gear 7 and thus tends to carry the members 25 and 26 ahead of the member 24 which is driven more slowly through the gear 10. Thus the threaded connection between the members 24 and 25 effects the separation of the clutch members 25 and 26 from the cooperating clutch member 28 and the connection between the gear 10 and the driven element 35 is thereby released, the driven element 35 being rotated at a slightly increased rate of speed determined by the ratio of the cooperating gears 2, 2, 14 and 7, this comprising the second or intermediate speed ratio.

If it be now assumed that a further increase in speed of the vehicle will effect the clutching of the plates 36 and 36a, the driven element 35 will be connected directly to the shaft 1 through the element 33 which is keyed to the shaft. When this action takes place, the gears 2 and 7 are now locked together, the gear 2 being connected to the driven element 35 through the member 33 and the clutch plates 36, 36a, and the gear 7 being connected to the driven element 35 through the member 31, the clutch plates 30, 30a, and the member 29 which is carried by the driven element 35. Thus the gears 2 and 7 must rotate in unison, but since they are of different diameter and are in mesh with the integral gears 12 and 14 respectively, the several compound gears 12, 14, and 16 can no longer rotate on the shafts 15 and thus the gearing will be locked, the housing 17 being driven in a clockwise direction by the gear 2. By reason of the threaded connection between the hub 18 of the housing 17 and the members 20 and 21, the latter will be separated and no clamping action will be exerted thereby on the braking member 23 which is splined to the casing 5. The entire mechanism thus far described will therefore rotate at the speed of rotation of the shaft 1 and the driven element 35 will be rotated directly by the shaft 1, or at the highest speed of which the transmission is capable.

If the construction thus far described be examined it will be seen that the provision of threaded connections between the members 18 and 20 and the members 24 and 25 is by no means an essential detail. For instance, the arrangement shown in the drawings is such that when the member 18 tends to rotate in a counterclockwise direction the members 20 and 21 grip the braking member 23 to prevent such rotation. On the other hand, when the member 18 tends to rotate in a clockwise direction this braking action is released and the member 18 runs freely. Thus the arrangement shown in the drawings acts simply as a one-way brake or clutch between the member 18 and the transmission casing 5 and the device may be replaced by any simple form of roller or pawl clutch acting between these members.

Similarly, the connection between the members 24 and 29 may be replaced by any form of one-way or overrunning clutch, it being observed that the arrangement shown in the drawings is the full equivalent of such a clutch. For instance, when the member 24 is rotated in a clockwise direction with respect to the members 25 and 26, the last named members are coupled for rotation with the member 29, but when the member 24 tends to rotate in a direction counterclockwise with respect to the direction of rotation of the members 25 and 26, for instance when the member 24 is rotating in the same direction as the members 25 and 26 but at a slower speed, the clutching action is discontinued and no effective frictional connection is provided between the members 25 and 29. It will therefore be seen that the construction is readily adaptable to suit various conditions of operation and that in this and other respects the arrangement shown in the drawings for the purpose of illustrating the invention may be varied to a considerable extent without affecting the nature of operation of the transmission mechanism.

Dealing now with the mechanism for operating the clutch plates 30, 30a and 36, 36a, and referring more particularly to Figures 1, 5 and 6 of the drawings, it will be observed that the member 35, hereinbefore described for convenience as the driven element, is provided with a plurality of rearwardly directed pins 81, these pins extending through apertures 82 and 83 provided in disks 37 and 39 respectively which are disposed adjacent to and rearwardly of the member 35.

Similarly, the disk 37 is provided with a plurality of pins 41 which extend rearwardly through apertures 42 in the disk 39. The disk 37 is journalled on the member 33 for rotation about the axis of the shaft 1 and the disk 39 is bolted or otherwise secured to a member 43 which is journalled on the shaft 1 and which comprises the ultimate driven member of the automatic speed ratio changing portion of the transmission mechanism.

It is apparent from an inspection of Figures 2, 3, and 4 of the drawings that the pins 41 and 81 are arranged equidistant from the axis of the shaft 1 and are disposed alternately, it being observed, however, that the arrangement of the pins and their number may be varied without affecting the operation of the device. The disk 37 is provided with a plurality of sleeves 85 which pass through the disk and are secured rigidly thereto, a shaft 87 passing through each sleeve 85 and being rotatable and axially slidable therein. A member 86 provided with a slot 88 encompassing a bushing 90 on the outer end of each pin 81 is keyed or otherwise secured as indicated at 92 to the rearwardly extending end of each shaft 87, each such member 86 comprising in effect a two armed lever supported for pivotal movement within the corresponding sleeve 85 and being loaded adjacent the end remote from the slot 88 in any suitable manner, for instance by means of a weight member 89 bolted or otherwise secured thereto.

Similarly the disk 39 carries a plurality of sleeves 45 rigidly secured thereto, a shaft 47 extending through each sleeve and being slidably and rotatably mounted therein. A member 46 likewise comprising a two armed lever is keyed or otherwise rigidly secured to the rearwardly projecting end of each shaft 47, and is provided with a slot 48 encompassing a bushing 49 surrounding a corresponding pin 41. Each member 46 is loaded at one end by means of a weight member 44 secured thereto and is capable of swinging with the shaft 47 within the sleeve 45. The members 46 and 86 may be further secured to the shafts 47 and 87 respectively by means of nuts 40 threaded on the ends of the shafts. Each shaft 47 carries a clutch finger 50 at its forward end, this clutch finger extending inwardly toward the axis of the shaft 1 and being positioned to cooperate with the clutch plates 36, 36a when moved to the left from the position shown in Figure 5 to engage these plates and couple the members 33 and 35 for rotation. Similarly each shaft 87 is provided at its inner end with a clutch finger 94 rigidly secured thereto and cooperating with the clutch plates 30 and 30a to couple the members 31 and 32 for rotation when the shafts 87 are moved to the left as shown in Figure 6.

It will be observed that cooperating cam surfaces 52 are formed on the sleeves 45 and the weighted members 46 and that similar cooperating cam surfaces 95 are formed on the sleeves 85 and the members 86. Thus when the outer weighted ends of either the members 46 or the members 86 swing outwardly about the axis of the shafts on which they are supported in response to centrifugal force, the cooperating cam surfaces 52 and 95 will thrust the corresponding shafts to the left as viewed in Figures 5 and 6 to engage the clutches associated with these shafts by means of the clutch fingers 50 and 94. It will also be observed that when the member 35 and the pins 81 carried thereby are rotated in a clockwise direction as viewed from the forward end of the transmission or in a counterclockwise direction as viewed in Figures 2, 3, and 4, the members 86 by reason of their slotted connection with these pins will tend to move to the position shown in Figure 2 with the weighted ends of the members 86 in their innermost position in engagement with the member 43 and will be retained in that position as long as the speed of rotation is relatively slow. However, as the speed of rotation increases, the weights 89 carried by the members 86 tend to move outwardly in direct opposition to the force exerted by the pins 81, and thus when the speed becomes sufficient to overcome this force the members 86 will be rotated to the position shown in Figure 3 to shift the shafts 87 to the left through the medium of the cooperating cam surfaces 95 as shown in Figure 6 to engage the clutch plates 30, 30a.

Similarly, the rotation of the disk 37 in a clockwise direction as viewed from the forward end of the transmission or in a counterclockwise direction as viewed in Figures 2, 3, and 4 will tend to move the members 46 associated with the pins 41 to the position shown in Figure 2 in which the weights 44 abut the driven member 43. However, when the speed of rotation of the disk 39 is sufficiently increased, the centrifugal force acting on the weights 44 will be sufficient to swing the members 46 to the position shown in Figure 4 and thus through the action of the cam surfaces 52 to move the shafts 47 to the left as viewed in Figure 5 to engage the cooperating clutch members 36, 36a. The weights 89 are of greater mass than the weights 44, and thus if it be assumed that the speed of rotation of the member 35 and the disk 37 is gradually increasing, the members 86 will first be moved from the position which they occupy in Figure 2 of the drawings as the result of centrifugal force, and thus the position of the parts shown in Figure 3 will result, and the clutch plates 30, 30a will be first engaged as suggested heretofore. As the speed of rotation continuues to increase, the weights 44 of less mass are affected and the members 46 are rotated to the position shown in Figure 4 so that the clutch plates 36, 36a are engaged. If without further increase in speed the torque exerted by the pins 41 and 81 on the members 46 and 86 is assumed to be increased, the reverse action will take place, the members 46 first swinging to the position shown in Figure 3 of the drawings by reason of the lesser mass of the weights 44 carried thereby. On further increase in torque the members 86 will be swung to the position shown in Figure 2.

The operation of that portion of the apparatus thus far described will now be apparent. When no torque is being supplied to the transmission mechanism, for instance if the mechanism is applied to a motor vehicle and the vehicle clutch is disengaged, it may be assumed that the weighted members 46 and 86 which control the speed ratio occupy the position shown in Figure 2 and the various clutches shown in Figure 1 are disengaged. As the vehicle clutch is engaged, the action hereinbefore described takes place, the housing 17 being retained against movement by the braking action of the engaged members 20, 21, and 23, and the low speed gear 10 being clutched to the members 29, 32, and 35 by the engagement of the cooperating members 25, 26, and 28. The torque thus transmitted to the member 35 is exerted through the pins 81, the weighted members 86, the sleeves 85 in which the members are supported, the disk 37, the pins 41 carried by the latter, the weighted members 46, the sleeves 45 in which these weighted members are supported, to the disk 39 which is in turn secured to the driven element 43. This torque holds all of the weighted members 46 and 86 in the position shown in Figure 2 until, in response to an increased speed of rotation, the centrifugal force acting on the heavier of the weighted members 86 is sufficient to overcome the action of the torque when these members 86 will move outwardly and the position of the parts will be that shown in Figure 3 of the drawings. In moving outwardly the weighted members 86 serve to engage the clutch plates 30 and 30a as hereinbefore described. The operation previously recited now follows, the braking members 20, 21, and 23 being retained in frictional engagement, the clutch members 25, 26, and 28 being released, with the result that the driving torque is transmitted through the gear 7 and the second or intermediate speed ratio is selected.

When a still higher speed of the driven members is reached, the weighted members 46 will likewise swing outwardly in response to centrifugal force with the result that the clutch plates 36, 36a are engaged and the entire mechanism including the planetating gears mounted within the housing 17 is rotated about the axis of the shaft 1, a direct drive being effected from the shaft to the member 33 and thence to the member 35 and the associated speed and torque responsive ratio selecting apparatus. If the torque should not be gradually increased (without corresponding increase in the speed of rotation), the force exerted by the pins 41 acting in the slots in the weighted members 46 will first restore these members to the position shown in Figure 3 in view of the fact that the centrifugal force tending to swing these members outwardly is less than the centrifugal force acting on the members 86. This operation releases the clutch plates 36, 36a and the parts are restored to the intermediate speed ratio, the driving torque passing through the gear 7 by reason of the engagement of the braking members 20, 21, and 23 as hereinbefore explained. If the torque is still further increased (without corresponding increase in the speed of rotation), the weighted members 86 will swing toward the shaft 1 and the parts will occupy the position shown in Figure 2 of the drawings with the result that the cooperating clutch plates 30, 30a will be freed. The clutch members 25 and 26 will now lag behind the member 24 which is driven through the gear 10 and are urged into frictional engagement with the cooperating clutch member 28 by the action of the threaded connection between the members 24 and 25 with the result that the drive is transmitted through the members 29, 32, and 35, the low speed ratio having been selected.

It is important to ensure in a device of this character that there shall be no hunting action, in other words, that there shall be no delicate balance between the effect produced by variations in torque and speed which might result under some conditions in incomplete selection or frequent repeated shifting from one gear ratio to the other. In order to avoid this difficulty the slots 48 and 88 in the members 46 and 86 respectively are so arranged with respect to the axes about which the members 46 and 86 swing, and with respect to the direction of movement of the pins 41 and 81 in these slots, that once selecting action is initiated in response either to speed or torque change such action is definitely completed. It will be observed, for instance, on reference to Figures 2 to 4 of the drawings, that when the members 46 occupy the position shown in Figure 2, the inclination of the slot 48 is such that the force exerted by the pin 41 on the member 46 opposing the action of centrifugal force on the weight member 44 is considerable since the slot is inclined rearwardly from the pin 41 toward the axis about which the member 46 swings. On the other hand, when the member 46 is eventually swung to the position shown in Figure 4 of the drawings by increased speed, the leverage exerted by the pin 41 tending to swing the member 46 inwardly against the action of centrifugal force is very much reduced since the slot 48 extends nearly at right angles to a line connecting the axis of the pin with the axis about which the member 46 swings. It is thus apparent that if a selective action is once initiated, for instance, by an increase in speed, a considerably greater torque effect is required to alter the selective action in the reverse direction than is required to prevent the selection from the initial position. For this reason the apparatus shown is quite stable, the weighted members 46 and 86 normally occupying either the inner position in which they abut the member 43 or the outer position in which they abut suitable stop pins 96 provided on the face of the disk 39.

There are other points inherent in the construction which are of importance in preventing any hunting action. For instance, the centrifugal force acting on the weighted members 46 and 86 is appreciably greater when these members occupy their outer positions for the reason that they are then rotating in a much larger orbit around the axis of the shaft and consequently at a greater rate of linear speed, the force increasing in substantially direct proportion to the radius of the center of mass of these members. Thus when the members have assumed their outer positions, appreciably more torque must be transmitted through the pins 41 and 81 and the members 46 and 86 in order to return these members from the outer positions against the action of centrifugal force than is required to retain them in their inner positions with a given speed of rotation.

It will also be observed that when the weighted members 46 and 86 occupy the inner positions, the pins 41 and 81 act on these members at points which are further removed from the fulcrums of the weighted members than when these members occupy their outer positions. Thus an amount of torque which is sufficient to retain the weights in the inner positions will not suffice to shift the weights inwardly from their outer positions by reason of the decreased leverage exerted on the weights when the latter occupy their outer positions.

It may also be pointed out that it is not essential to load the members 86 with a mass greater than that of the members 46. In the first place, it is quite apparent that the desired result may be obtained by suitably proportioning the leverage between the pins 41 and 81 and the members 46 and 86 respectively so that the torque required to retain the members 86 in their inner positions will be less than that required to retain the members 46 in their inner positions, and the members 86 will first swing outwardly in response to continued increase in speed with no appreciable and corresponding increase in torque.

As a matter of fact, the construction is such that the desired result may be obtained in some degree regardless of any difference in the actual construction of the members 46 and 86 or their respective driving connections with the corresponding pins 41 and 81. For instance, when the clutch 30, 30a is engaged, the plates 35 and 37 are gripped together by reason of the fact that the sleeve 85 is carried by the plate 37 and the action of the clutch fingers 94 carried by this sleeve tends to thrust the sleeve and the plate 37 to the right as shown in Figure 6 to intimately engage the plates 35 and 37. Thus the friction between these plates retards the return of the weights 86 to their inner positions since relative movement of the plates 35 and 37 must necessarily accompany the retraction of the weighted members 86.

Similarly, when the remaining weighted members 46 swing outwardly, the plates 35, 37, and 39 are all gripped together, the action of the clutch finger 50 in engaging the cooperating clutch plates 36, 36a tending to thrust the plate 39 to the right as shown in Figure 5 and thus to press the plates 35, 37, and 39 together. The friction thus developed between the plates 37 and 39 tends to retard the return of the weights 46 to their inner positions since relative movement of the plates 37 and 39 must necessarily accompany the retraction of the weighted members 46.

It will be noted from the foregoing discussion that the plates 35 and 37 are gripped together by the action of both sets of clutch fingers 50 and 94 which, in engaging the corresponding clutches, tend to thrust the corresponding sleeves 45 and 85 to the right as shown in Figures 5 and 6, whereas friction is developed between the plates 37 and 39 solely as the result of the action of the clutch fingers 94 in engaging the clutch plates 30, 30a. It is therefore quite apparent that when the weighted members 46 and 86 are all in their outward positions, the friction which tends to retard the return of these weighted members to their inner positions is greater with respect to the weighted members 86 than with respect to the weighted members 46, and the latter will first tend to return to their inner positions in response to increase in torque with no corresponding increase in speed.

In this manner the friction developed between the several plates 35, 37 and 39 serves not only to stabilize the operation of the control mechanism by preventing the freeing of the clutches 30 and 36 until the torque-speed ratio has been increased to a considerable extent, but also assists in freeing these clutches in the proper successive order during continued increase in torque.

It will be observed that ample clearance should be provided between the sleeves 45 and the members 35, 37 through which these sleeves extend to permit relative movement thereof without interference, and similarly that clearance should be provided between the sleeves 85 and the members 35 and 39. This is effected in the arrangement shown in the drawings by the provision of suitable apertures in the members through which the sleeves pass, but alternatively the periphery of the members 35, 37 and 39 may be entirely cut away for this purpose. Similarly the slots 82 and 83 in the disks 37 and 39 and the slot 42 in the disk 39 through which the pins 81 and 41 respectively extend are preferably of sufficient length to permit free movement of these pins, it being observed that the slots 83 must be longer than the slots 82 and 42 in order to afford proper clearance for the pins 81 since the disk 39 is shifted as the speed increases first with respect to the member 35 and thereafter with respect to the members 35 and 37 in response to the action of the weighted members 46 and 86.

In order to provide for the operation of the automatic change speed gearing hereinbefore described, to drive the vehicle either in a forward or reverse direction and to permit operation of the vehicle in a forward direction at a speed lower than that permitted by the automatically selected transmission, a supplementary manually operated change speed gearing is provided at the rear of the automatic change speed gearing. This manually operated gearing is shown in the drawings as housed within a transmission casing 53 integral with the casing 5, but it will be appreciated that a separate and distinct casing secured to the casing 5 may be provided. The gearing in question is of more or less conventional nature, and is accessible through an opening in the upper side of the casing 53 which is normally closed by means of a cover plate 54 bolted to the casing proper and serving to support the usual gear shift lever 55. This lever cooperates with a pair of sliding yokes 56, 57 supported in the conventional manner on rods 58 carried by the casing 53. It will be noted in Figure 1 of the drawings that the driven member 43 of the automatic change speed gearing is journalled directly in the end wall of the casing 5 by means of roller bearings 59, and that a driven shaft 60 is journalled in the member 43. The rearward end of the shaft 60 is journalled by means of roller bearings 61 in the casing 53, a suitable bearing retainer 62 being provided. Thus the driving shaft 1 and the driven shaft 60 are provided with cooperating bearing portions and each shaft is supported at its opposite ends directly in the casing through which it extends. The shaft 60 carries at its rearward end the conventional coupling plate 63 which is adapted to be connected to an ultimate driven member, for instance the propeller shaft of a motor vehicle.

Gears 66 and 67 are supported on the shaft 60 for sliding movement thereon and rotative movement therewith, for instance by being splined thereto, the gear 66 being controlled by the yoke 56 and the gear 67 being controlled by the yoke 57 in the well-known manner. Gear 67 is further provided with an internally toothed portion 69 at its forward end adapted to engage and be coupled with a toothed member 70 carried by or formed integrally with the member 43.

The shaft 71 extending parallel to the shaft 60 is supported in the casing 53 and gears 72, 73 are journalled on this shaft, the two last named gears being preferably integral. The gear 72 meshes with the gear 70 and the gear 73 is positioned for meshing engagement with the gear 66 when the latter is slid forwardly from the position which it occupies in Figure 1 of the drawings.

It will be observed by reference to Figure 7 of the drawings, which is a development of the gearing within the casing 53, that a further shaft 74 is supported within the casing, gears 75 and 76 being journalled on this shaft, the last named gears being preferably integrally formed. The shaft 74 is so positioned that the gear 75 meshes with the gear 72 and thus the gear 76 is driven through the gears 70, 72, and 75, the direction of rotation being the same as that of the member 43. Furthermore, the gear 76 is positioned for meshing engagement with the gear 67 when the latter is slid rearwardly on the shaft 60 whereby this shaft may be rotated in the reverse direction.

In order to properly define the neutral position of the gear shift lever 55, a plate 77 is rigidly mounted in the casing 53, this plate passing between the upper ends of the yokes 56 and 57 and being cut away as shown at 78 to permit the passage of the gear shift lever from operative engagement with one yoke to engagement with the other yoke at the neutral position which the parts occupy in Figure 7. The ball detent 79 is positioned intermediate the yokes and seats in apertures therein, the depth of these apertures being such as to permit the ball to move within one yoke to lock the same to the plate 77 when the other yoke has been displaced from neutral position in a manner which is well understood.

If now the yoke 57 is slid to the left as shown in Figure 7 so that the internally toothed portion 69 thereof engages the end of the toothed member 70, the shaft 60 will be coupled directly to the member 43. This is the position which the parts normally occupy during operation of a vehicle in a forward direction. If it be desired to reverse the direction of the vehicle, the gear shift lever 55 is operated to shift the gear 67 rearwardly into engagement with the gear 76 to drive the gear 67 in a reverse direction. If a low forward speed is required, the yoke 57 is placed in the neutral position shown in Figure 7 and the yoke 56 is engaged by the gear shift lever to shift the gear 66 into mesh with the gear 73 so that the shaft 60 is driven through the gears 70, 72, 73, and 66 at a relatively low rate of speed. This is useful under conditions of particularly heavy load or, alternatively, when it is desired to use the motor through reduction gearing as a brake in descending a hill. It will be apparent that under such conditions the automatic change speed gearing will be placed in the high speed ratio by reason of the reduced torque and thus an increased braking effect can be obtained by providing a lower speed ratio in the gearing between the member 43 and the driven shaft 60.

It will be observed that an extremely compact arrangement suitable for use in motor vehicles is thus provided, the gearing requiring no manual operation whatever under normal conditions and the usual gear shift lever being operated only to reverse the direction of drive of the vehicle or to facilitate the handling of the vehicle in descending steep grades. It is furthermore obvious that when the transmission mechanism is used for other purposes than the propulsion of motor vehicles in which only three speed ratios in one direction are required, the manual control may be dispensed with altogether.

It may be also noted that no meshing of gears is required in effecting the automatic shift from one speed ratio to another, the selection being affected solely by the manipulation of friction clutches, so that undesirable noise and excessive wear ordinarily resulting from the continued shifting of the gears into and out of mesh is entirely avoided.

Referring now to the modified arrangement shown in Figures 10 to 16 inclusive of the drawings, it will be observed that the automatic change speed gearing is enclosed in a housing 110 provided with a removable inspection plate 111 at its upper side and secured at its forward end to a housing 113 in which clutch operating mechanism, hereinafter described, is supported. A driving shaft 114 extends into the housing 110 and is rotatably supported within a sleeve 116 which is in turn journalled by means of antifriction bearings 117 in a plate 119, the peripheral portion 120 of which is interposed between the housings 110, 113, these housings and the plate being bolted or otherwise secured together.

The driving shaft 114 carries a gear 121 which is keyed or otherwise secured to the shaft and which meshes with the internally toothed portion 122 of a gear 123, the gear 123 having an externally toothed portion 124.

It will be noted that the gear 123 is supported for rotation about an axis offset from the axis of the driving shaft 114, the gear being provided for this purpose with an annular hub portion 125 which is journalled on an eccentric member 128 by means of antifriction bearings 129, the member 128 being formed integrally with or secured to the rearward end of the sleeve 116. An annular gear 130 surrounds the gears hereinbefore described and is provided with an internally toothed portion meshing with the externally toothed portion 124 of the gear 123. The gear 130 is supported for rotation about the axis of the driving shaft 114, for instance by securing the same to a member 132 having a hub portion 133 journalled on the driving shaft 114.

It will be observed that the construction thus far described is in effect a planetating gear system, the eccentric member 128 constituting a carrier for the compound gear 123 which constitutes the planet element and which is in mesh by means of its external and internal toothed portions with the gear 130 and the driving gear 121 respectively.

As in the previously described modification, provision is made for retaining the eccentric member or carrier 128 against rotation under certain conditions of operation. For this purpose a braking element 135, non-rotatably supported within the housings 111 and 113, is disposed in close proximity to a corresponding braking element 136 which is in turn carried by a hub member 137 rotatable on the sleeve 116 and having a threaded or equivalent connection 139 therewith. Thus when the member 136 is moved into engagement with the member 135 by the action of the threaded connection 139, the rotation of the eccentric carrier 128 will be retarded, the friction being preferably increased by the provision of a suitable annular friction element 140 secured to the face of the member 136.

A member 145, preferably in the form of a substantially annular drum, surrounds the gearing thus far described and is carried by members 146 and 147 located at the ends thereof, these members being bolted or otherwise secured to the drum 145 and forming a part thereof. The member 146 is provided with a hub portion 148 journalled on the sleeve 116 and the member 147 is provided with a hub portion 149 journalled on the shaft 114. In this manner the drum 145 is supported for rotation about the axis of the shaft 114 and the member 147 may be considered for convenience the driven element of the change speed gearing, ignoring for the moment those parts of the mechanism which serve to effect the selection of the various speed ratios. Thus the desired speed ratio can be obtained by coupling the drum 145 selectively to either of two elements of the gear train hereinbefore described having different speeds of rotation, for instance the gears 130 and 123.

The coupling of the gear 130 to the drum 145 is effected by a clutch of which the member 132 supporting the gear 130 forms one part and a member 152 connected with the drum 145 forms the other part. The member 152 has a non-rotative connection indicated at 153 with the drum, this connection being such as to permit a limited axial displacement of the member 152. A hub member 155 having a threaded or similar connection 154 with the hub portion 133 of the member 132 serves to support a member 157, the arrangement being such that under certain conditions of operation the cooperating clutch members 132, 157, and 152 are clamped together by the action of the threaded connection 154 to effect coupling of the gear 130 to the drum 145.

Coupling of the gear 123 to the drum 145 is effected through a friction clutch 160 which preferably comprises cooperating friction plates having a non-rotative and axially slidable connection with the drum 145 and with a member 162 supported for rotation on the sleeve 116 respectively. The member 162 is provided with one or more circular depressions 163 in the face thereof, the hub portion 125 of the gear 123 being provided with one or more axially projecting pins 165, each of which extends into one of the depressions 163 in the member 162, reference being made to Figures 10 and 17 of the drawings. It will be noted that by means of this arrangement the plates forming the clutch 160 are coupled for rotation with the gear 123 in such a manner as to permit relative radial movement thereof. This or some equivalent form of coupling is necessary for the reason that the drum 145 and the gear 123 are rotatable about displaced axes.

Means are also provided for coupling the driving shaft 114 directly to the drum 145, this means comprising a member 168 keyed or otherwise secured to the shaft 114 and a clutch comprising cooperating interleaved plates 170, the plates having a non-rotative and axially slidable connection with the member 168 and the drum 145 respectively.

The mode of operation of the gearing thus far described is as follows. Assuming that the drum 145 is the driven element and that the shaft 114 is rotated in a clockwise direction as viewed from the left hand end of Figure 10, the gear 121 will tend to rotate the gear 123 in a clockwise direction. If the clutches 160 and 170 are disengaged, the inertia of the gear 130 and the small amount of friction between this gear and the members 152 and 157, necessarily present even though no clamping action takes place, will retard the rotation of the gear 130 to an extent sufficient to cause the gear 123 to climb around the gear 130, carrying the eccentric member 128 and the sleeve 116 in a counterclockwise direction. By reason of the threaded connection 139 between the hub member 137 of the braking member 136, the latter will be moved axially into engagement with the cooperating braking member 135 and thus the eccentric 128 will be held against rotation. The gear 123 will therefore be rotated on the member 128 by the gear 121 and will in turn drive the gear 130 in a clockwise direction, the gears acting as a simple train having fixed axes. The member 133 carried by the gear 130 will now act through the threaded connection 154 to move the member 157 axially so that the clutch members 132 and 152 are firmly engaged. The drum 145 to which the member 152 is keyed will therefore be driven in a clockwise direction at a relatively low rate of speed determined by the diameters of the several gears in the train.

If it be now assumed that the clutch 160 is engaged by means to be hereinafter described, the gear 123 will be coupled to the drum 145 through the member 162 and the clutch 160. Obviously the gear 123 is rotating more rapidly than the final gear 130 of the reducing train, and thus the clutch member 152 will tend to move ahead of the member 132 in a clockwise direction and will carry the member 157 with it. By reason of the threaded connection 154 between the member 157 and the member 132, the member 157 will be moved axially away from the member 152 and the clutch will be disengaged. This provides the second or intermediate speed, it being noted that the eccentric member 128 is still retained against rotation by the friction brake 135, 136 since the gear 123 still tends to climb in a counterclockwise direction about and within the gear 123.

If it be now assumed that the clutch 170 is engaged, the driving shaft 114 will be coupled directly to the drum 145 to provide the high or direct speed ratio. Since the gears 123 and 121 are now both coupled to the shaft, there can be no relative rotation between them, and the gear 123 together with the eccentric member 128 will be carried in a clockwise direction with the result that the threaded connection 139 between the sleeve 116 and the member 136 will withdraw the latter from the cooperating braking member 135, the entire gearing now being free to rotate as a unit about the axis of the shaft 114.

In this form of the invention the means which serves to hold the planetating gear carrier against rotation also functions as a clutch to interrupt the transmission of torque to the gearing. For this purpose, the braking member 135 is supported for axial movement toward and from a position in which it may be engaged by the cooperating braking member 136 when the latter is moved forwardly by the threaded connection 139 with the sleeve 116. For instance, the braking member 135 may be supported as shown in Figure 10 of the drawings in which the plate 119 is provided with a plurality of apertures 172 through which the elements 173 extend, these elements being preferably formed integrally with the braking member 135. Each element 173 is provided with an aperture 174 to receive one arm 175 of a two armed lever 176, the latter being fulcrumed at 177 on the plate 119. The remaining arm 178 on each lever 176 is provided with a roller 179 which is adapted to engage a conical member 180 axially slidable on a sleeve 181 which is in turn threaded or otherwise secured on the sleeve 116. A coil spring 183 acting between the conical member 180 and the plate 119 urges the former to the left as shown in Figure 10, suitable stop means, for instance a retaining ring 185, being provided on the sleeve 181 to limit the axial movement of the member 180. A clutch shaft 187 to which a fork 188 is secured extends transversely of the housing 113 and is supported for rotation therein, this fork engaging a collar 190 formed on or secured to the member 180.

When the shaft 187 is rotated in a counterclockwise direction as viewed in Figure 10, the conical member 180 will be moved to the right against the action of the spring 183 and will act through the lever 176 to withdraw the braking member 135 from the cooperating member 136. Thus if the gearing is to be used in a motor vehicle, the arrangement just described may be used in lieu of the usual vehicle clutch since the operation of the gearing in either low or intermediate ratios is dependent upon the engagement of the cooperating braking members 135 and 136.

The mechanism for controlling the clutches 160 and 170 in response to the speed of the driven element and the torque transmitted thereto is similar to that described in connection with the preferred form of the invention, either of these arrangements being capable of use with either of the gearing constructions hereinbefore described. It will be observed that the member 147 forming part of the drum 145 is provided with a plurality of rearwardly directed pins 200, these pins extending through apertures 201 and 202 provided in disks 204 and 205 respectively which are disposed adjacent to and rearwardly of the member 147.

Similarly the disk 204 is provided with a plurality of pins 225 which extend rearwardly through apertures 226 in the disk 205. The disk 204 is journalled on the hub portion 149 of the member 147 for rotation about the axis of the driving shaft 114, and the disk 205 is connected to a shaft 206 which constitutes the ultimate driven member of the automatic speed ratio changing portion of the transmission mechanism.

The disk 204 carries a plurality of sleeves 208 which pass through the disk and are secured rigidly thereto, a shaft 209 passing through each sleeve 208 and being rotatable and axially slidable therein. A member 210 provided with a slot 211 encompassing each pin 200 is keyed or otherwise secured as indicated at 212 to the rearwardly extending end of each shaft 209, each such member 210 constituting in effect a two armed lever supported for pivotal movement within the corresponding sleeve 208 and being loaded adjacent the end thereof remote from the slot 211 in any suitable manner, for instance by means of a weight member 213 bolted or otherwise secured thereto.

Similarly, the disk 205 carries a plurality of sleeves 228 rigidly secured thereto, a shaft 230 extending through each sleeve and being slidably and rotatably mounted therein. A member 232 is keyed or otherwise rigidly secured to the rearwardly projecting end of each shaft 230, each member 232 being provided with a slot 233 encompassing a corresponding pin 225. Each member 232 is likewise loaded at one end by means of a weight member 234 secured thereto and is capable of swinging with and about the axis of the shaft 230. The members 232 and 210 may be further secured to the shafts 230 and 209 respectively by means of nuts 215 threaded on the ends of the shafts.

A sleeve 236 provided with a clutch finger 235 is slidably mounted on each shaft 230, the finger extending inwardly toward the axis of the shaft 114 and being positioned to cooperate with the clutch plates 170 when moved to the right from the position shown in Figure 15 to engage these plates and thus couple the shaft carried member 168 and the drum 145 for rotation. For this purpose the shaft 230 is yieldingly connected to the sleeve 236 by means of a coil spring 238 positioned within the sleeve and acting between the latter and the nuts 237 threaded on the shaft, the tension of the spring being adjustable to regulate the degree of compression applied to the clutch plates 170. Each sleeve 236 passes through an aperture 239 in the drum supporting member 146 and is threaded within or otherwise secured to an annular member 240 which it serves to support. The member 240 is provided with ears 241 to which levers 242 are pivoted, one arm of each lever engaging the end of a corresponding shaft 230, the other arm of each lever engaging a radially extending flange 244 provided on a sleeve 245 which is axially slidable and rotatable on the hub portion 148 of the drum supporting member 146. A shaft 248 extending transversely of the housing 110 and supported for rotation therein carries a fork 249 which is keyed or otherwise secured thereto and which engages a collar 250 on the sleeve 245. It is apparent that by rotating the shaft 248, which may be provided with any convenient form of operating mechanism, the annular member 240 and the sleeve 236 will be drawn to the left from the position shown in Figure 10 of the drawings against the action of the spring 238 to relieve the clutch action of the plates 170, regardless of the position of the shaft 230, the lever 242 rocking about the end of the shaft.

Each shaft 209 is similarly provided with a clutch finger 214 which is secured thereto and which cooperates with the clutch plates 160 to couple the member 162 and the drum 145 for rotation when the shafts 209 are moved to the right as shown in Figure 16.

It will be observed that cooperating cam surfaces 216 are formed on the sleeves 228 and the weighted members 232 and that similar cooperating cam surfaces 218 are formed on the sleeves 208 and the members 210. Thus when the outer weighted ends of either the members 232 or the members 210 swing outwardly about the axis of the shafts on which they are supported in response to centrifugal force, the cooperating cam surfaces 216 and 218 will thrust the corresponding shafts to the right as viewed in Figures 15 and 16 to engage the clutches associated with these shafts by means of the clutch fingers 235 and 214. On the contrary, when the arms 232 and 210 swing in the opposite direction against the action of centrifugal force, the shafts 230 and 209 are moved to the left to release the clutches 170 and 160 by means of similar cooperating cam surfaces 220 and 221 respectively formed on the shafts and the sleeves in which they are supported.

It will also be seen that when the member 147 and the pins 200 carried thereby are rotated in a clockwise direction as viewed from the forward end of the transmission or in a counterclockwise direction as viewed in Figures 11 and 12, the members 210 by reason of their slotted connection with these pins will tend to move inwardly to a position in which the weighted portions thereof are positioned adjacent the member 206, and will be retained in that position as long as the speed of rotation is relatively slow. However, as the speed of rotation increases, the weights 213 carried by the members 210 tend to move outwardly in direct opposition to the force exerted by the pins 200, and thus when the speed becomes sufficient the members 210 will be rotated to the position shown in Figures 11 or 12 to shift the shafts 209 to the rear through the medium of the cooperating cam surfaces 218 to engage the clutch plates 160.

Similarly the rotation of the disk 204 in a clockwise direction as viewed from the forward end of the transmission or in a counterclockwise direction as viewed in Figures 11 and 12 will tend to move the members 232 associated with the pins 225 to shift the weighted arms of these members inwardly to the position which they occupy in Figure 12. However, when the speed of rotation of the disk 205 is sufficiently increased, the centrifugal force acting on the weights 234 will be sufficient to swing the members 232 to the position shown in Figure 11 and thus through the action of the cam surfaces 216 to move the shafts 230 to the right as viewed in Figure 15 to engage the cooperating clutch plates 170.

The weights 213 are of greater mass than the weights 234, and thus if it be assumed that the speed of rotation of the member 35 and the disk 37 is gradually increasing, the members 210 will first be moved outwardly as the result of centrifugal force, and thus the position of the parts shown in Figure 12 will result, and the clutch plates 160 will be first engaged as suggested hereinbefore. As the speed of rotation continues to increase, the weights 234 of less mass are affected and the members 232 are rotated to the position shown in Figure 11 so that the clutch plates 170 are engaged. If without further increase in speed the torque exerted by the pins 225 and 200 on the members 232 and 210 is assumed to be increased, the reverse action will take place, the members 232 first swinging to the position shown in Figure 12 of the drawings by reason of the lesser mass of the weights 234 carried thereby. On further increase in torque the members 210 will be similarly swung inwardly to disengage the clutch plates 160.

The operation of that portion of the apparatus thus far described will now be apparent. When no torque is being supplied to the transmission mechanism, for instance if the mechanism is applied to a motor vehicle and the vehicle clutch is disengaged, it may be assumed that the weighted members 232 and 210 which control the speed ratio occupy the position in which the members 232 are shown in Figure 12 and extend inwardly adjacent the shaft 114, and the various clutches shown in Figure 10 are disengaged. As the vehicle clutch is engaged, for instance by the operation of the shaft 187 to position the braking member 135 in close proximity to the braking member 136, the action hereinbefore described takes place, the eccentric member 128 being retained against movement by the cooperation of the braking members 135 and 136, and the low speed gear 130 being clutched to the drum 145 by the engagement of the cooperating members 132, 157, and 152. The torque thus transmitted to the drum 145 is exerted through the pins 200, the weighted members 210, the sleeves 208 in which the members are supported, the disk 204, the pins 225 carried by the latter, the weighted members 232, the sleeves 228 in which these weighted members are supported, to the disk 205 which in turn carries the driven element 206. This transmitted torque holds all of the weighted members 232 and 210 in their innermost position until the speed of rotation attained is sufficient to overcome the effect of torque, when, in response to centrifugal force, the heavier of the weighted members 210 will move outwardly and the position of the parts will be that shown in Figure 12 of the drawings. In moving outwardly the weighted members 210 serve to engage the clutch plates 160 as hereinbefore described. The operation previously recited now follows, the braking members 135 and 136 being retained in frictional engagement, and the clutch members 132, 157, and 152 being released, with the result that the driving torque is transmitted through the gear 123 and the second or intermediate speed ratio is selected.

When a still higher speed of the driven members is reached, the weighted member 232 will likewise swing outwardly in response to centrifugal force, with the result that the clutch plates 170 are engaged and the entire mechanism including the planetating gear 123 is rotated about the axis of the shaft 1, a direct drive being effected from the shaft to the member 168 and thence to the member 147 and the associated speed and torque responsive ratio selecting apparatus. If the torque should now be gradually increased, the force exerted by the pins 225 acting in the slots in the weighted members 232 will first restore these members to the position shown in Figure 12, in view of the fact that the centrifugal force tending to swing these members outwardly is less than the centrifugal force acting on the members 210. This operation releases the clutch plates 170 and the parts are restored to the intermediate speed ratio, the driving torque being transmitted through the gear 123 and the clutch plates 160. If the torque is still further increased the weighted members 210 will be swung toward their inner positions adjacent the shaft 1 with the result that the cooperating clutch plates 160 will be freed. The member 133 carried by the gear 130 will now tend to rotate ahead of the member 157 in a clockwise direction and will thus through the threaded connection 154 engage the cooperating clutch members 132, 157, 152, with the result that the drive is transmitted through the low gear 130 to the drum 145, the low speed ratio having been selected.

It will be noted that the driven element 206 is journalled on the hub member 149 of the member 147 which is in turn journalled on the rear end of the shaft 114. The element 206 is also journalled in a bearing 260 carried by the end wall of the casing 110 and thus the driving shaft and the driven element are adequately supported for rotation in the casing. A supplementary housing 262 is secured to the rear of the main housing 110 and serves to enclose the manually operable gearing for obtaining either forward or reverse drives at any of the speed ratios selected by the automatic transmission gearing. For this purpose, an ultimate driven shaft 264 is journalled in a bearing 265 supported in the rear wall of the casing 262, the shaft 264 and the element 206 being telescoped as indicated at 266. A gear 268 is carried by the driven shaft 264 and is provided with an externally toothed portion 269 and inwardly facing clutch teeth 270, the latter cooperating with clutch teeth 272 carried by and preferably formed integrally with a gear 274, the latter being splined or otherwise slidably and non-rotatably supported on the element 206.

A shaft 277 extends longitudinally of the casing 262 and gears 278 and 279, formed integrally or otherwise secured for rotation, are journalled on the shaft 277. The gear 279 is positioned for continuous meshing engagement with an idler gear 280 which is supported in any conventional manner in the casing 262, the gear 280 being positioned for meshing engagement with the gear 274 when the latter is slid to the left from the position shown in Figure 10. The gear 278 meshes with the gear 268 on the driven shaft 264. A yoke 285 or other conventional gear shifting means is provided to slide the gear 274 axially to engage the clutch teeth 272 and 270 to connect the driven shaft 264 and the element 206 directly or to engage the gears 274 and 280 to provide for reverse rotation of the shaft 264.

The application of this gearing to the operation of a motor vehicle will be at once apparent. The manually operable gearing enclosed within the casing 262 is first manipulated to select either the forward or reverse drive in the manner just described while the braking member 135 is withdrawn from the cooperating member 136. The shaft 187 controlling the braking member 135 is now released, the operation being identical with that involved when the usual vehicle clutch is provided, and the braking members 135 and 136 coact to initiate operation of the gearing and to select the low speed ratio. The selection of the other speed ratios then proceeds automatically.

If, however, it is desired when descending a steep grade to use the motor as a brake through reduction gearing, the shaft 248 may be rotated to release the clutch plates 170 independently of the action of the weighted members 232 and the gearing will be placed in intermediate speed ratio in precisely the same manner as if these plates 170 had been released by the weight members 232. Thus the motor may be utilized as a brake with greater effectiveness than if the gearing were coupled directly in the high speed ratio.

In this modification of the invention as well as in the embodiment first described it will be noted that the threaded connections 139 and 154 for engaging the braking members 135 and 136 and the clutch members 152 and 132 respectively are not an essential part of the construction since they function merely in the manner of one-way clutches as hereinbefore pointed out. Various other modifications and alterations of the structural details may be effected without departing from the fundamental feature of the invention which consists in the provision of means in which forces proportioned to the torque transmitted through and the speed attained by the driven element are directly opposed to select a speed ratio appropriate to the existing conditions of torque and speed.

Having thus described the invention, what is claimed as new and desired to be secured by Letters Patent is:

1. In a variable speed transmission mechanism, the combination with a driving member, of a driven member, selective change speed gearing including a planetary gear set for operatively connecting said members, means for retarding planetating movement of said gear set in one direction only, means including a clutch for effecting an operating connection between said driven member and said gear set in one direction of rotation of the latter only, and means associated with and responsive to increase in speed of said driven member for directly coupling said driving and driven members.

2. In a variable speed transmission mechanism, the combination with a driving member, of a driven member, selective change speed gearing including a planetary gear set for operatively connecting said members, a one way brake for preventing planetating movement of said gear set in a direction reverse to the direction of rotation of said driving member, means including a one way clutch for operatively connecting said gear set to said driven member to rotate the latter at a reduced speed in the direction of rotation of said driving member, and means associated with said driven member and operable when the latter reaches a predetermined speed for locking said driving and driven members, whereby said brake and clutch are rendered ineffective.

3. In a variable speed transmission mechanism, the combination with a driving member, of a driven member, selective change speed gearing including a planetary gear set for operatively connecting said members, a one way brake for preventing planetating movement of said gear set in a direction reverse to the direction of rotation of said driving member, means including a one way clutch for operatively connecting said gear set to said driven member to rotate the latter at a reduced speed in the direction of rotation of said driving member, and means for operatively connecting said planetary gear set to said driven member to drive the latter at a speed greater than said reduced speed in the direction of rotation of said driving member, whereby said clutch is rendered ineffective.

4. In a variable speed transmission mechanism, the combination with a driving member, of a driven member, selective change speed gearing including a planetary gear set for operatively connecting said members, a one way brake for preventing planetating movement of said gear set in a direction reverse to the direction of rotation of said driving member, means including a one way clutch for operatively connecting said gear set to said driven member to rotate the latter at a reduced speed in the direction of rotation of said driving member, means for operatively connecting said planetary gear set to said driven member to drive the latter at a speed greater than said reduced speed in the direction of rotation of said driving member, whereby said clutch is rendered ineffective, and a device associated with said driven member for initiating operation of said last named means when a predetermined speed-torque ratio is reached.

5. In a variable speed transmission mechanism, the combination with a driving member, of a driven member, selective change speed gearing including a planetary gear set for operatively connecting said members, a one way brake for preventing planetating movement of said gear set in a direction reverse to the direction of rotation of said driving member, means including a one way clutch for operatively connecting said gear set to said driven member to rotate the latter at a reduced speed in the direction of rotation of said driving member, means for operatively connecting said planetary gear set to said driven member to drive the latter at a speed greater than said reduced speed in the direction of rotation of said driving member, whereby said clutch is rendered ineffective, and means for coupling said driving and driven members for rotation, whereby said clutch and brake are rendered ineffective.

6. In a variable speed transmission mechanism, the combination with a driving member, of a driven member, selective change speed gearing including a planetary gear set for operatively connecting said members, a one way brake for preventing planetating movement of said gear set in a direction reverse to the direction of rotation of said driving member, means including a one way clutch for operatively connecting said gear set to said driven member to rotate the latter at a reduced speed in the direction of rotation of said driving member, means for operatively connecting said planetary gear set to said driven member to drive the latter at a speed greater than said reduced speed in the direction of rotation of said driving member, whereby said clutch is rendered ineffective, means for coupling said driving and driven members for rotation, whereby said clutch and brake are rendered ineffective, and separate devices associated with said driven member for initiating operation of each of said last named means successively in response to a progressive increase in the speed-torque ratio of said driven element.

7. In a variable speed transmission mechanism, the combination with a driving member, of a driven member, means comprising selective change speed gearing interposed between said members, said gearing including a first device operable to select one speed ratio and a second device operable to select a higher speed ratio, torque-speed responsive apparatus included in said first named means and operatively connected to said devices and said driven member to transmit torque therebetween, and connections between said apparatus and said devices for initiating operation of said devices successively as the ratio of speed to torque in said apparatus is progressively increased.

8. In a variable speed transmission mechanism, the combination with a driving member, of a driven member, means comprising selective change speed gearing interposed between said members, said gearing including a first device operable to select one speed ratio and a second device operable to select a higher speed ratio, torque-speed responsive apparatus included in said first named means and operatively connected to said devices and said driven member to transmit torque therebetween, and connections between said apparatus and said devices for initiating operation of said devices successively as the ratio of speed to torque in said apparatus is progressively increased, said apparatus including separate torque transmitting portions arranged in series, each of said portions being allocated to one only of said devices.

9. In clutch operating mechanism, the combination with a pair of clutches, of apparatus for automatically rendering said clutches operative and inoperative in response to changes in speed-torque ratio, said apparatus being operatively connected to said clutches to receive torque therefrom and including two devices arranged in series for transmitting such torque therethrough, one of said devices being allocated to each of said clutches for operation thereof.

10. In clutch operating mechanism, the combination with a pair of clutches, of apparatus for automatically rendering said clutches operative and inoperative in response to changes in speed-torque ratio, said apparatus being operatively connected to said clutches to receive torque therefrom and including two devices arranged in series for transmitting such torque therethrough, one of said devices being allocated to each of said clutches for operation thereof, each of said devices comprising means movable in response to centrifugal force in one direction and movable in response to transmitted torque in the opposite direction.

11. In clutch operating mechanism, the combination with a pair of clutches, of apparatus for automatically rendering said clutches operative and inoperative in response to changes in speed-torque ratio, said apparatus being operatively connected to said clutches to receive torque therefrom and including two devices arranged in series for transmitting such torque therethrough, one of said devices being allocated to each of said clutches for operation thereof, each of said devices comprising a weighted member movable in response to centrifugal force in one direction and movable in response to transmitted torque in the opposite direction, one of said weighted members having less mass, whereby one of said clutches will be rendered operative before the other clutch as the speed-torque ratio increases.

12. In a variable speed transmission mechanism, the combination with a driving member, of a driven member, selective change speed gearing including a compound planetary gear having a plurality of toothed portions of different diameter for operatively connecting said members, a carrier for said gear, means for retarding planetation of said gear in a direction reverse to the direction of rotation of said driving member, means including a one way clutch for operatively connecting one toothed portion of said gear to said driven member to rotate the latter at a reduced speed in the direction of rotation of said driving member, a device for operatively connecting a second toothed portion of said gear with said driven member to rotate the latter at a speed greater than said reduced speed, and means associated with said driven member and operable in response to speed of the latter to control said device.

13. In a variable speed transmission mechanism, the combination with a driving member, of a driven member, selective change speed gearing including a compound planetary gear having a plurality of toothed portions of different diameter for operatively connecting said members, a carrier for said gear, means for retarding planetation of said gear in a direction reverse to the direction of rotation of said driving member, means including a one way clutch for operatively connecting one toothed portion of said gear to said driven member to rotate the latter at a reduced speed in the direction of rotation of said driving member, a device for operatively connecting a second toothed portion of said gear with said driven member to rotate the latter at a speed greater than said reduced speed, a second device for operatively connecting said driving and driven members for direct rotation, and means associated with said driven member and operable in response to increase in the speed-torque ratio thereof to initiate operation of said devices in the order named.

14. In a variable speed transmission mechanism, the combination with a driving member, of a driven member, selective change speed gearing for connecting said members for rotation at three distinct speed ratios, and means through which torque is transmitted to said driven member for effecting selection of said change speed gearing in decreasing ratio in response to increased torque, said means being responsive to variation in speed of said driven member to effect selection of said change speed gearing in increasing ratio, said means serving to select and maintain each of the three speed ratios when corresponding predetermined relationships between the torque and speed are established.

15. In a variable speed transmission gearing, the combination with a driving member, of a driven member, selective change speed gearing for connecting said members for rotation at three distinct speed ratios, and a device associated with said driven member and operable by directly opposed forces derived from the speed of the driven member and the torque transmitted thereto for effecting automatic selection of said change speed gearing in any of the three speed ratios.

16. In a variable speed transmission, the combination with a driving member, of a driven member, a selective change speed gearing having three distinct ratios connecting said members, means associated with said gearing and said driven element and movable in response to change in speed of the latter for controlling the selection of said gearing in all three ratios, and means for transmitting torque through said last named means to directly oppose such movement.

17. In a variable speed transmission, the combination with a driving shaft, of a driven shaft, an externally toothed gear secured to said driving shaft, a gear carrier supported for rotation about the axis of said driving shaft, a gear element supported for rotation on said carrier, said gear element having three externally toothed portions of different diameter thereon, one of said toothed portions meshing with said first named gear, a pair of gears rotatable on said driving shaft and meshing respectively with the remaining toothed portions of said gear element, clutches for effecting connection of each gear of said pair of gears with said driven shaft, and means responsive to variation in speed of the driven shaft and the torque transmitted thereto for effecting selective operation of said clutches.

18. In a variable speed transmission, the combination with a driving shaft, of a driven shaft, an externally toothed gear secured to said driving shaft, a gear carrier supported for rotation about the axis of said driving shaft, a gear element supported for rotation on said carrier, said gear element having three externally toothed portions of different diameter thereon, one of said toothed portions meshing with said first named gear, a pair of gears rotatable on said driving shaft and meshing respectively with the remaining toothed portions of said gear element, a brake for retarding rotation of said carrier, clutches for effecting connection of each gear of said pair of gears with said driven shaft, and means responsive to variation in speed of the driven shaft and transmitted torque for effecting selective operation of said clutches and brake.

19. In a variable speed transmission, the combination with a driving shaft, of a driven shaft, a driving gear rotatable with said driving shaft, a gear carrier, a planet gear set rotatable on said carrier and meshing with said driving gear, a pair of gears of different diameter rotatable about the axis of said driving shaft and meshing with said planet gear set, means for retaining said carrier against rotation in one direction, a one way clutch for connecting one of said pair of gears with said driven shaft, and a clutch operable to connect the other of said pair of gears with the driven shaft.

20. In a variable speed transmission, the combination with a driving shaft, of a driven shaft, a driving gear rotatable with said driving shaft, a gear carrier, a planet gear set rotatable on said carrier and meshing with said driving gear, a pair of gears of different diameter rotatable about the axis of said driving shaft and meshing with said planet gear set, means for retaining said carrier against rotation in one direction, a one way clutch for connecting one of said pair of gears with said driven shaft, a clutch operable to connect the other of said pair of gears with the driven shaft, and a device associated with the driven shaft for automatically operating said last named clutch in response to variation in the speed of the driven shaft and the torque transmitted thereto.

21. In a variable speed transmission, the combination with a driving shaft, of a driven shaft, a driving gear rotatable with said driving shaft, a gear carrier, a planet gear set rotatable on said carrier and meshing with said driving gear, a pair of gears of different diameter rotatable about the axis of said driving shaft and meshing with said planet gear set, means for retaining said carrier against rotation in one direction, a one way clutch for connecting one of said pair of gears with said driven shaft, a clutch operable to connect the other of said pair of gears with the driven shaft, and a clutch operable to directly connect said driving and driven shafts.

22. In a variable speed transmission, the combination with a rotatable driving member, of a rotatable driven member, selective change speed gearing including a planetary gear set connecting said members, a device rotating with said driven member and operable when a predetermined speed of the latter is attained for selecting and rendering the gearing operative at one definite speed ratio, and a second device rotatable with said driven member and operable when a greater speed of the latter is reached for selecting and rendering the gearing operative at a second definite speed ratio differing substantially from the first named speed ratio.

23. In a variable speed transmission, the combination with a driving member, of a driven member, selective change speed gearing connecting said members, a device associated with said driven member and operable when a predetermined speed of the latter is attained for selecting one speed ratio, and a second device associated with said driven member and operable when a greater speed of the latter is reached for selecting a second speed ratio, said devices being operable in response to centrifugal force, and means for applying torque transmitted to said driven member through said devices to directly oppose the action of centrifugal force thereon.

24. In a variable speed transmission mechanism, the combination with a driving member, of a driven member, selective change speed gearing including a planetary gear set for operatively connecting said members, means for retarding planetating movement of said gear set in one direction only, means including a one-way clutch for effecting an operating connection between said driven member and said gear set in one direction of rotation of the latter only, and means including a second clutch for directly coupling said driving and driven members, whereby said first named clutch is rendered ineffective.

25. In a variable speed transmission mechanism, the combination with a driving member, of a driven member, selective change speed gearing including a planetary gear set for operatively connecting said members, means for retarding planetating movement of said gear set in a direction reverse to the direction of rotation of said driving member, means including a one-way clutch for operatively connecting said gear set to said driven member to rotate the latter at a reduced speed in one direction of rotation only, and means for operatively connecting said planetary gear set to said driven member to drive the latter at a speed greater than said reduced speed in the direction of rotation of said driving member, whereby said clutch is rendered ineffective.

26. In a variable speed transmission mechanism, the combination with a driving member, of a driven member, selective change speed gearing including a planetary gear set for operatively connecting said members, means for retarding planetating movement of said gear set in a direction reverse to the direction of rotation of said driving member, means including a one-way clutch for operatively connecting said gear set to said driven member to rotate the latter at a reduced speed in one direction of rotation only, means for operatively connecting said planetary gear set to said driven member to drive the latter at a speed greater than said reduced speed in the direction of rotation of said driving member, whereby said clutch is rendered ineffective, and means for coupling said driving and driven members for rotation as a unit.

27. In a variable speed transmission mechanism, the combination with a driving member, of a driven member, selective change speed gearing for connecting said members, said gearing including a compound planetary gear having a plurality of toothed portions of different diameter, a driving gear meshing with said planetary gear, and a plurality of driven sun gears, a carrier for said planetary gear, means associated with said carrier for retarding planetation of said planetary gear in a direction reverse to the direction of rotation of said driving member, means including a one-way clutch for operatively connecting one of said driven sun gears to said driven member to rotate the latter at a reduced speed in the direction of rotation of said driving member, a shiftable clutch for operatively connecting a second one of said driven sun gears with said driven member to rotate the latter at a speed greater than said reduced speed, a second shiftable clutch for operatively connecting said driving and driven members for direct rotation, and means associated with said driven member and operable in response to increase in the speed-torque ratio thereof to initiate operation of said shiftable clutches in the order named.

28. In a variable speed transmission mechanism, the combination with a driving member, of a driven member, apparatus including a planetary gear set for operatively connecting said members, said apparatus including a pair of shiftable clutches operable successively to place said gear set in two distinct ratios and a pair of torque-speed responsive devices for receiving and transmitting torque to said driven member, each of said torque-speed responsive devices being operatively connected to one of said shiftable clutches for controlling the same in response to changes in speed and torque, and means whereby on continued increase in the speed-torque ratio, said devices are operated in succession to control said clutches in like succession.

29. In clutch operating mechanism, the combination with a pair of clutches of the type requiring axial pressure to render the same active, of a member positioned to receive and transmit the axial thrust resulting from the activation of one and both of said clutches, a first element arranged in axial series with said member and positioned to receive and transmit the said axial thrust therefrom, a second element arranged in axial series with said first element and positioned to receive the said axial thrust therefrom, said elements and said member being supported for relative rotation, a first device carried by said first element and responsive to centrifugal force, said first device being operatively connected with one of said clutches and being movable on rotation of said first element with respect to said member in opposition to centrifugal force to activate the associated clutch, a second device carried by said second element and responsive to centrifugal force, said second device being operatively connected with the other of said clutches and being movable on rotation of said second element with respect to said first element in opposition to centrifugal force to activate the associated clutch, whereby on activation of one of the said clutches by one of said devices on rotation of the associated element, the resulting axial pressure develops friction to retard rotation of the other element and thereby the activation of the other clutch, and whereby on activation of both clutches on rotation of both elements, the resulting increased axial pressure retards reverse rotation of either of said elements and thereby the release of either clutch.

30. In clutch operating mechanism, the combination with a pair of clutches of the type requiring axial pressure to render the same active, of a member positioned to receive and transmit the axial thrust resulting from the activation of one and both of said clutches, a first element arranged in axial series with said member and positioned to receive and transmit the said axial thrust therefrom, a second element arranged in axial series with said first element and positioned to receive the said axial thrust therefrom, said elements and said member being supported for relative rotation, a first device carried by said first element and responsive to centrifugal force, said first device being operatively connected with one of said clutches and being movable on rotation of said first element with respect to said member in opposition to centrifugal force to activate the associated clutch, a second device carried by said second element and responsive to centrifugal force, said second device being operatively connected with the other of said clutches and being movable on rotation of said second element with respect to said first element in opposition to centrifugal force to activate the associated clutch, whereby on activation of one of the said clutches by one of said devices on rotation of the associated element, the resulting axial pressure develops friction to retard rotation of the other element and thereby the activation of the other clutch, and whereby on activation of both clutches on rotation of both elements, the resulting increased axial pressure retards reverse rotation of either of said elements and thereby the release of either clutch, and means whereby the torque transmitted through the said clutches is opposed to the action of centrifugal force on said devices.

31. In a transmission mechanism, the combination with a change speed gearing, of a clutch associated with said gearing and operable to alter the ratio of the latter, said clutch being of the type requiring axial pressure to operate the same, a torque-speed responsive device for receiving and transmitting torque from said gearing, said device being connected to said clutch and movable to two positions to operate the latter in response to changes in speed and torque, and means for opposing the movement of the device to one of the said positions by the axial pressure applied to the clutch, whereby the device tends to remain in the other of the said positions when moved thereto.

32. In a variable speed transmission mechanism, the combination with a driving member, of a driven member, selective change speed gearing including a planetary gear set for operatively connecting said members, means for retarding planetating movement of said gear set in one direction only, means including a clutch for effecting an operating connection between said driven member and said gear set in one direction of rotation of the latter only, means associated with and responsive to increase in speed of said driven member for directly coupling said driving and driven members, and manually operable means for effecting release of said retarding means.

33. In a variable speed transmission mechanism, the combination with a driving member, of a driven member, selective change speed gearing including a planetary gear set for operatively connecting said members, means for retarding planetating movement of said gear set in a direction reverse to the direction of rotation of said driving member, means including a one-way clutch for operatively connecting said gear set to said driven member to rotate the latter at a reduced speed in one direction of rotation only, means for operatively connecting said planetary gear set to said driven member to drive the latter at a speed greater than said reduced speed in the direction of rotation of said driving member, whereby said clutch is rendered ineffective, and manually operable means for effecting release of said retarding means.

34. In a variable speed transmission mechanism, the combination with a driving member, of a driven member, selective change speed gearing including a planetary gear set for operatively connecting said members, means for retarding planetating movement of said gear set in one direction only, means including a clutch for effecting an operating connection between said driven member and said gear set in one direction of rotation of the latter only, means associated with and responsive to increase in speed of said driven member for directly coupling said driving and driven members, and manually operable means for rendering said last named means ineffective.

35. In a variable speed transmission mechanism, the combination with a driving member, of a driven member, selective change speed gearing including a planetary gear set for operatively connecting said members, means for retarding planetating movement of said gear set in a direction reverse to the direction of rotation of said driving member, means including a one-way clutch for operatively connecting said gear set to said driven member to rotate the latter at a reduced speed in one direction of rotation only, means for operatively connecting said planetary gear set to said driven member to drive the latter at a speed greater than said reduced speed in the direction of rotation of said driving member, whereby said clutch is rendered ineffective, means for coupling said driving and driven members for rotation as a unit in response to change in the speed-torque ratio of said driven member, and means for manually releasing said last named means.

36. In a variable speed transmission mechanism, the combination with a driving member, of a driven member, means including selective change speed gearing operatively connecting said members, and a device associated with said driven member and operable by directly opposed forces derived from the speed of the driven member and the torque transmitted thereto for effecting selection of said change speed gearing.

37. In a variable speed transmission mechanism, the combination with a driving shaft, of a driven shaft coaxial with said driving shaft, selective change speed gearing for connecting said shafts, said gearing comprising a pinion carried by and rotatable with said driving shaft, a compound gear element having an internally toothed portion meshing with said pinion and an externally toothed portion, means journalled on said driving shaft provided with an eccentric bearing portion on which said compound gear element is journalled for rotation about an axis displaced from the axes of said shafts, a fixed housing for said gearing, means including a one-way clutch acting between said housing and said means to prevent rotation of the latter in one direction only, said one-way clutch being structurally independent of the remaining elements of the transmission mechanism, an internally toothed gear supported for rotation about the axes of said shafts and meshing with the externally toothed portion of said compound gear element, means affording a driving connection between said internally toothed gear and said driven shaft, and means responsive to the speed of rotation of said driven shaft and operable when a predetermined speed is exceeded for locking said change speed gearing for rotation as a unit.

38. In a variable speed transmission mechanism, the combination with a driving member, of a driven member, selective change speed gearing including a gear set for operatively connecting said members, said gear set having a reactive element serving as a fulcrum therefor, means for retarding movement of said reactive element in one direction only, means including a clutch for effecting an operative connection between said driven member and said gear set in one direction of rotation of the latter only, and means associated with and responsive to increase in speed of said driven member for directly coupling said driving and driven members.

39. In a variable speed transmission mechanism, the combination with a driving member, of a driven member, selective change speed gearing including a gear set for operatively connecting said members, said gear set having a reactive element serving as a fulcrum therefor, a one-way brake for preventing movement of said reactive element in a direction reverse to the direction of rotation of said driving member, means including a one-way clutch for operatively connecting said gear set to said driven member to rotate the latter at a reduced speed in the direction of rotation of said driving member, and speed responsive means associated with said driven member and operable when the latter reaches a predetermined speed for locking said driving and driven members, whereby said brake and clutch are rendered ineffective.

40. In a variable speed transmission mechanism, the combination with a driving member, of a driven member, selective change speed gearing including a gear set for operatively connecting said members, said gear set comprising a reactive element serving as a fulcrum therefor, means for retarding movement of said reactive element in one direction only, means including a one-way clutch for effecting an operative connection between said driven member and said gear set in one direction of rotation of the latter only, and means including a second clutch for directly coupling said driving and driven members, whereby said first named clutch is rendered ineffective.

41. In a variable speed transmission mechanism, the combination with a driving member, of a driven member, selective change speed gearing including a gear set for operatively connecting said members, said gear set comprising a reactive element serving as a fulcrum therefor, means for retarding movement of said reactive element in a direction reverse to the direction of rotation of said driving member, means including a one-way clutch for operatively connecting said gear set to said driven member to rotate the latter at a reduced speed in one direction of rotation only, and means for operatively connecting said gear set to said driven member to drive the latter at a speed greater than said reduced speed in the direction of rotation of said driving member, whereby said clutch is rendered ineffective.

42. In a variable speed transmission mechanism, the combination with a driving member, of a driven member, selective change speed gearing including a gear set for operatively connecting said members, said gear set comprising a reactive element serving as a fulcrum therefor, means for retarding movement of said reactive element in a direction reverse to the direction of rotation of said driving member, means including a one-way clutch for operatively connecting said gear set to said driven member to rotate the latter at a reduced speed in one direction of rotation only, means for operatively connecting said gear set to said driven member to drive the latter at a speed greater than said reduced speed in the direction of rotation of said driving member, whereby said clutch is rendered ineffective, and means for coupling said driving and driven members for rotation as a unit.

43. In a variable speed transmission, the combination with a driving member, of a driven member, means comprising selective change speed gearing interposed between said members, said gearing including two members operable to effect selection of two distinct gear ratios, and apparatus for automatically operating said members in response to changes in speed-torque ratio, said apparatus being comprised in said first named means and being operatively connected to said gearing to receive torque therefrom and to transmit the same to said driven member, and including two devices arranged in series for transmitting such torque therethrough, one of said devices being allocated to each of said members for operation thereof.

44. In a variable speed transmission, the combination with a driving member, of a driven member, means comprising selective change speed gearing interposed between said members, said gearing including two members operable to effect selection of two distinct gear ratios, and apparatus for automatically operating said members in response to changes in speed-torque ratio, said apparatus being comprised in said first named means and being operatively connected to said gearing to receive torque therefrom and to transmit the same to said driven member, and including two devices arranged in series for transmitting such torque therethrough, one of said devices being allocated to each of said members for operation thereof, each of said devices comprising a weighted member movable in response to centrifugal force in one direction, and movable in response to transmitted torque in the other direction, and a lever system for applying torque to each weighted member, the leverage exerted by said system decreasing as the weighted member is moved in one direction in response to centrifugal force.

45. In a clutch operating mechanism, the combination with a pair of clutches, of apparatus for automatically rendering said clutches operative and inoperative in response to changes in speed-torque ratio, said apparatus being operatively connected to said clutches to receive torque therefrom and including two devices arranged in series for transmitting such torque therethrough, one of said devices being allocated to each of said clutches for operation thereof, each of said devices comprising a weighted member movable in response to centrifugal force in one direction and movable in response to transmitted torque in the opposite direction, and a lever system for applying torque to each weighted member, the leverage exerted by said system decreasing as the weighted member is moved in one direction in response to centrifugal force.

WILLIAM ISIAH WHEELER.